(12) United States Patent
Kennard et al.

(10) Patent No.: US 8,842,788 B2
(45) Date of Patent: Sep. 23, 2014

(54) SYSTEMS AND METHODS FOR IMPROVED HIGH CAPACITY IN WIRELESS COMMUNICATION SYSTEMS

(71) Applicant: Aviat U.S., Inc., Santa Clara, CA (US)

(72) Inventors: Paul A. Kennard, San Jose, CA (US); Sergio Licardie, Cupertino, CA (US)

(73) Assignee: Aviat U.S., Inc., Santa Clara, CA (US)

( * ) Notice: Subject to any disclaimer, the term of this patent is extended or adjusted under 35 U.S.C. 154(b) by 63 days.

(21) Appl. No.: 13/740,087

(22) Filed: Jan. 11, 2013

(65) Prior Publication Data

US 2013/0128936 A1 May 23, 2013

Related U.S. Application Data

(63) Continuation-in-part of application No. 13/654,294, filed on Oct. 17, 2012.

(60) Provisional application No. 13/740,087, filed on Jan. 11, 2013, provisional application No. 61/585,624, filed on Jan. 11, 2012.

(51) Int. Cl.
| | |
|---|---|
| H04B 7/10 | (2006.01) |
| H04L 1/02 | (2006.01) |
| H04B 7/12 | (2006.01) |
| H04L 5/14 | (2006.01) |
| H04B 7/08 | (2006.01) |

(52) U.S. Cl.
CPC .. *H04L 5/14* (2013.01); *H04B 7/12* (2013.01); *H04B 7/0837* (2013.01)
USPC ............................. 375/347; 375/222; 375/267

(58) Field of Classification Search
USPC ........................ 375/222, 267, 2, 99, 347, 299
See application file for complete search history.

(56) References Cited

U.S. PATENT DOCUMENTS

| | | |
|---|---|---|
| 5,422,913 A | 6/1995 | Wilkinson |
| 6,185,258 B1 | 2/2001 | Alamouti et al. |
| 6,704,579 B2 | 3/2004 | Woodhead et al. |
| 6,879,627 B1 | 4/2005 | Davidson et al. |
| 7,050,765 B2 | 5/2006 | Ammar et al. |
| 7,133,082 B2 | 11/2006 | Limberg |

(Continued)

FOREIGN PATENT DOCUMENTS

EP       0685973       12/1995

OTHER PUBLICATIONS

International Application No. PCT/US2013/026755, International Search Report and Written Opinion mailed Jun. 5, 2013.

(Continued)

*Primary Examiner* — Curtis Odom
(74) *Attorney, Agent, or Firm* — Sheppard, Mullin, Richter & Hampton LLP

(57) ABSTRACT

An exemplary system comprises at least one antenna, first and second signal paths, and an N-plexer. The first antenna may be configured to receive first and second diversity received signals. The first signal path may have a first converter configured to convert the first diversity received signal to first carrier group. The second signal path may have a second converter configured to convert the second diversity received signal to a second carrier group. The N-plexer may be configured to provide the first and second diversity received signals to a first cable in communication with a first modem.

29 Claims, 12 Drawing Sheets

(56) References Cited

U.S. PATENT DOCUMENTS

| | | |
|---|---|---|
| 7,792,494 B2 | 9/2010 | Shen et al. |
| 2002/0128043 A1 | 9/2002 | Chandler |
| 2004/0067739 A1 | 4/2004 | Sim et al. |
| 2005/0255888 A1 | 11/2005 | Cooper et al. |
| 2006/0030279 A1 | 2/2006 | Leabman |
| 2006/0052065 A1* | 3/2006 | Argaman et al. ............. 455/101 |
| 2006/0097940 A1 | 5/2006 | Shimawaki et al. |
| 2007/0030336 A1 | 2/2007 | Hoshigami et al. |
| 2007/0116162 A1 | 5/2007 | Eliaz et al. |
| 2007/0189154 A1 | 8/2007 | Hourtane et al. |
| 2007/0237242 A1 | 10/2007 | Gjertsen |
| 2010/0093282 A1 | 4/2010 | Martikkala et al. |
| 2010/0207834 A1 | 8/2010 | Wahlberg et al. |
| 2011/0053536 A1 | 3/2011 | Friedmann |
| 2011/0109520 A1 | 5/2011 | Buer et al. |
| 2011/0134972 A1 | 6/2011 | Zhu et al. |
| 2011/0235572 A1 | 9/2011 | Lorg et al. |
| 2012/0093100 A1 | 4/2012 | Qin et al. |
| 2012/0270507 A1 | 10/2012 | Qin et al. |

OTHER PUBLICATIONS

International Application No. PCT/US2012/035010, International Search Report and Written Opinion mailed Aug. 16, 2012.

International Application No. PCT/US2012/060656, International Search Report and Written Opinion mailed Mar. 13, 2013.

International Application No. PCT/US2013/021321, International Search Report and Written Opinion mailed Mar. 25, 2013.

\* cited by examiner

US 8,842,788 B2

SYSTEMS AND METHODS FOR IMPROVED HIGH CAPACITY IN WIRELESS COMMUNICATION SYSTEMS

CROSS-REFERENCE TO RELATED APPLICATIONS

The present application is a continuation-in-part of U.S. Nonprovisional patent application Ser. No. 13/654,294, filed Oct. 17, 2012 and entitled "Systems and Methods for Signal Frequency Division in Wireless Communication Systems," which claims the benefit of U.S. Provisional Patent Application Ser. No. 61/548,063, filed Oct. 17, 2011 and entitled "Combination of Main, Diversity and Cross Polar Signals on One Coax Cable," which are both incorporated by reference herein. This application also claims the benefit of U.S. Provisional Patent Application Ser. No. 61/585,624, filed Jan. 11, 2012 and entitled "Microwave Radios with Improved High Capacity Implementation," which is also incorporated by reference herein.

BACKGROUND

1. Field of the Invention(s)

The present invention(s) generally relate to combining signals across a cable between units of a wireless communication system. More particularly, the invention(s) relate to systems and methods for signal frequency division in wireless communication systems.

2. Description of Related Art

In split mount microwave radio systems, a transceiver may include an indoor unit (IDU) and an outdoor unit (ODU) coupled to an antenna. In one example, the IDU may be coupled to a server or other computer over a wired network (e.g., LAN, WAN, or the Internet) or to a mobile network base-station. Information to be wirelessly transmitted may be prepared by both the IDU and the ODU before wireless transmission. Similarly, the outdoor unit may receive signals from the antenna to provide to the server, other computer, or mobile network node via the IDU.

When multiple transmit signals are to be transmitted or multiple receive signals are to be received, two different ODUs may be used. Each different ODU may be coupled to one or more IDUs with at least two cables to provide the signals. Unfortunately, multiple cables between one or more ODUs and one or more IDUs may increase cost and require additional parts.

SUMMARY OF THE INVENTION

An exemplary system comprises at least one antenna, first and second signal paths, and an N-plexer. The at least one antenna may be configured to receive a first diversity receive signal and a second diversity receive signal, the first receive signal and the second receive signal being received at a receive radio frequency and having signal diversity, and to transmit a first diversity transmit signal and a second diversity transmit signal, the first transmit signal and the second transmit signal being received at a transmit radio frequency and having signal diversity. The first signal path may have a first frequency converter configured to downconvert the first diversity receive signal from the receive radio frequency to a first receive intermediate frequency and to upconvert the first diversity transmit signal from a first transmit intermediate frequency to the transmit radio frequency. The second signal path may have a second frequency converter configured to downconvert the second diversity receive signal from the receive radio frequency to a second receive intermediate frequency and to upconvert the second diversity transmit signal from a second transmit intermediate frequency to the transmit radio frequency. The N-plexer may be configured to provide the first diversity receive signal and the second diversity receive signal to a cable and to provide from the cable the first diversity transmit signal to the first signal path and the second diversity transmit signal to the second signal path.

The at least one antenna configured to receive the first diversity receive signal and the second diversity receive signal and the first diversity transmit signal and the second diversity transmit signal may comprise a first antenna and a second antenna, wherein the first antenna is configured to receive the first diversity receive signal and the first diversity transmit signal the second antenna is configured to receive the second diversity receive signal and the second diversity transmit signal. The first diversity receive signal and the first diversity transmit signal may be orthogonally polarized to the second diversity receive signal and the second diversity transmit signal.

In some embodiments, the system further comprises an orthomode transducer configured to provide the first diversity receive signal and the second diversity receive signal to the antenna and to receive the first diversity transmit signal and the second diversity transmit signal from the antenna, wherein the first diversity receive signal and the first diversity transmit signal are orthogonally polarized to the second diversity receive signal and the second diversity transmit signal. In various embodiments, the first antenna and the second antenna are spatially diversified.

The system may further comprise an other N-plexer and a modem. The other N-plexer may be configured to provide the first diversity transmit signal and the second diversity transmit signal to the cable and to provide from the cable the first diversity receive signal to a third signal path and the second diversity receive signal to the fourth signal path. The modem may be configured to receive the first and second diversity receive signals from the third and fourth signal paths, to demodulate the first and second diversity receive signals to a received data signal, to receive a transmission data signal, to modulate the transmission data signal to the first diversity transmit signal at the first transmit intermediate frequency, and to module the transmission data signal to the second diversity transmit signal at the second transmit intermediate frequency.

Further, the system may comprise a third frequency converter configured to downconvert the received data signal to a baseband frequency and upconvert a transmission data signal from a baseband frequency to the intermediate frequency. The first and second receive intermediate frequencies may be different. In some embodiments, the N-plexer, the other N-plexer, and the cable may be configured to simultaneously propagate the first and second diversity receive signals and the first and second diversity transmit signals across the cable.

In some embodiments, the N-plexer and the other N-plexer are further configured to propagate telemetry data across the cable.

In various embodiments, the second signal path having the second frequency converter may comprise a third signal path having a third frequency converter configured to downconvert the second diversity receive signal from the receive radio frequency to the second receive intermediate frequency and a fourth signal path having a fourth frequency converter configured to upconvert the second diversity transmit signal from the second transmit intermediate frequency to the transmit radio frequency, the second diversity transmit signal being received from a fourth signal path. The N-plexer configured to provide the first diversity receive signal and the second diversity receive signal to the cable and to provide from the cable the first diversity transmit signal to the first signal path and the second diversity transmit signal to the second signal path may comprise the N-plexer configured to provide the downconverted second diversity receive signal from the third path to the cable and the N-plexer configured to provide the second diversity transmit signal from the cable to the fourth signal path.

An exemplary system comprises receiving, by at least one antenna, a first diversity receive signal and a second diversity receive signal, the first receive signal and the second receive signal being received at a receive radio frequency and having signal diversity, downconverting, by a first frequency converter electrically coupled to a first signal path, the first diversity receive signal from the receive radio frequency to a first receive intermediate frequency, downconverting, by a second frequency converter electrically coupled to a second signal path, the second diversity receive signal from the receive radio frequency to a second receive intermediate frequency, providing, by an N-plexer, the first diversity receive signal and the second diversity receive signal to a cable, providing, by the N-plexer, a first diversity transmit signal from the cable to the first signal path and a second diversity transmit signal from the cable to the second signal path, upconverting, by the first frequency converter electrically coupled to the first signal path, the first diversity transmit signal from a first transmit intermediate frequency to a transmit radio frequency, up converting, by the second frequency converter electrically coupled to the second signal path, the second diversity transmit signal from a second transmit intermediate frequency to the transmit radio frequency, and transmitting, by the at least one antenna, the first diversity transmit signal and the second diversity transmit signal, the first transmit signal and the second transmit signal being received at the transmit radio frequency and having signal diversity.

Another exemplary system comprises at least one antenna, first and second signal paths, and a means for providing the first diversity receive signal and the second diversity receive signal to a cable. The at least one antenna may be configured to receive a first diversity receive signal and a second diversity receive signal, the first receive signal and the second receive signal being received at a receive radio frequency and having signal diversity, and to transmit a first diversity transmit signal and a second diversity transmit signal, the first transmit signal and the second transmit signal being received at a transmit radio frequency and having signal diversity. The first signal path may have a first frequency converter configured to downconvert the first diversity receive signal from the receive radio frequency to a first receive intermediate frequency and to upconvert the first diversity transmit signal from a first transmit intermediate frequency to the transmit radio frequency. The second signal path may have a second frequency converter configured to downconvert the second diversity receive signal from the receive radio frequency to a second receive intermediate frequency and to upconvert the second diversity transmit signal from a second transmit intermediate frequency to the transmit radio frequency. The means for providing the first diversity receive signal and the second diversity receive signal to a cable may be further configured to provide from the cable the first diversity transmit signal to the first signal path and the second diversity transmit signal to the second signal path, the means for providing being configured to provide the first diversity transmit signal and the second diversity transmit signal to the first and second signal path, respectively, based on a first frequency of the first diversity transmit signal and a second frequency of the second diversity transmit signal.

In various embodiments, an exemplary system comprises a first antenna, a first signal path, a second signal path, and a first N-plexer. The first antenna may be configured to receive a first diversity received signal and a second diversity received signal. The first received signal and the second received signal may be received at a received microwave frequency. The first received signal and the second received signal may have signal diversity. The first signal path may have a first converter configured to convert the first diversity received signal from the receive microwave frequency to a first carrier group. In one example, the first converter comprises a receiver, waveguide filter, and/or a signal separator. The second signal path may have a second converter configured to convert the second diversity received signal from the receive microwave frequency to a second carrier group. In one example, the second converter comprises a receiver, waveguide filter, and/or a signal separator. The first N-plexer may be configured to provide the first carrier group and the second carrier group to a first cable in communication with a first modem.

The first antenna may be further configured to receive a third diversity received signal and a fourth diversity received signal. The third diversity received signal and the fourth diversity received signal may be received at the received microwave frequency. The third diversity received signal and the fourth diversity may have signal diversity. The system may further comprise a third signal path having a third converter configured to convert the third diversity received signal from the receive microwave frequency to a third carrier group, a fourth signal path having a fourth converter configured to convert the fourth diversity received signal from the receive microwave frequency and to a fourth carrier group, and a second N-plexer configured to provide the third and fourth carrier groups to a second cable in communication with a second modem.

In some embodiments, the first modem retrieves the first and second received signal from the first and second carrier group and provides the first and second received signal to a first path in communication with customer premises equipment. The second modem may retrieve the third and fourth received signal from the third and fourth carrier group and provides the third and fourth received signal to a second path in communication with customer premises equipment.

The first diversity received signal and the fourth diversity received signal may be vertically polarized signals from the first antenna and the second diversity received signal and the third diversity received signal may be horizontally polarized signals from the first antenna.

The system may further comprise a third N-plexer. The third N-plexer may be configured to receive the first carrier group and the second carrier group from the first cable. The first modem may be configured to demodulate signals of the first and second carrier groups.

The system may further comprise a fourth N-plexer. The fourth N-plexer may be configured to receive the third carrier group and the fourth carrier group from the second cable. The second modem may be configured to demodulate signals of the third and fourth carrier groups. The first modem may communicate with the second modem to take advantage of polarization diversity.

In some embodiments, the first modem performs maximum ratio combining utilizing the first diversity signal and the second diversity signal. The first and fourth diversity receive signals may be provided from an orthomode transducer coupled to the first antenna. The second and third diversity receive signals may be diverse from the first and fourth diversity receive signals, the second and third diversity receive signals may be provided from the orthomode transducer coupled to the first antenna.

In various embodiments, the first, second, third and fourth carrier groups each comprise 28 MHz carriers or channels.

In some embodiments, the first modem provides a first transmit diversity signal as a fifth carrier group and the second modem provides a second transmit diversity signal as a sixth carrier group. The third N-plexer may be further configured to provide the fifth carrier group to the first cable. The fourth N-plexer may be further configured to provide the sixth carrier group the second cable. The first N-plexer may be further configured to provide the fifth carrier group to a first transmitter for transmission of the first transmit diversity signal over the first antenna at a first polarization. The second N-plexer may be further configured to provide the sixth carrier group to a second transmitter for transmission of the second transmit diversity signal over the first antenna at a second polarization, the first polarization being diverse to the second polarization.

In various embodiments, the first cable may propagate the first, second, and fifth carrier groups simultaneously.

An exemplary method may comprise receiving, by a first antenna, a first diversity received signal and a second diversity received signal, the first received signal and the second received signal being received at a received microwave frequency and the first received signal and the second received signal having signal diversity, converting, by a first converter electrically coupled to a first signal path, the first diversity received signal from the received microwave frequency to a first carrier group, converting, by a second converter electrically coupled to a second signal path, the second diversity received signal from the received microwave frequency to a second carrier group, and providing, by a first N-plexer, the first carrier group and the second carrier group to a first cable in communication with a first modem.

In various embodiments, the method further comprises receiving, by the first antenna, a third diversity received signal and a fourth diversity received signal, the third diversity received signal and the fourth diversity received signal being received at the received microwave frequency and the third diversity received signal and the fourth diversity having signal diversity, converting, by a third converter electrically coupled to a third signal path, the third diversity received signal from the received microwave frequency to a third carrier group, converting, by a fourth converter electrically coupled to a fourth signal path, the fourth diversity received signal from the received microwave frequency to a fourth carrier group, and providing, by a second N-plexer, the third carrier group and the fourth carrier group to a second cable in communication with a second modem.

An exemplary system comprises a first antenna, a first means for converting, a second means for converting and a first N-plexer. The first antenna may be configured to receive a first diversity received signal and a second diversity received signal. The first received signal and the second received signal may be received at a received microwave frequency. The first received signal and the second received signal may have signal diversity. The first means for converting may convert the first diversity received signal from the receive microwave frequency to a first carrier group. The second means for converting may convert the second diversity received signal from the receive microwave frequency to a second carrier group. The first N-plexer may be configured to provide the first carrier group and the second carrier group to a first cable in communication with a first modem.

BRIEF DESCRIPTION OF THE DRAWINGS

The drawings are provided for purposes of illustration only and merely depict typical or example embodiments. These drawings are provided to facilitate the reader's understanding and shall not be considered limiting of the breadth, scope, or applicability various embodiments.

The figures are not intended to be exhaustive or to limit the embodiments to the precise form disclosed. It should be understood that various embodiments may be practiced with modification and alteration.

DETAILED DESCRIPTION OF THE INVENTION

Some embodiments described herein enable a reduction of signal interconnections between units in wireless communication systems such as microwave systems. In one example, the interconnection may be reduced by one or more cables.

In various embodiments, multiple transmit and/or receive signals may be combined on a single IDU-ODU cable (e.g., a coaxial cable). This process may allow the transmit and receive signals to be dedicated to main and diversity signals in one application and transmit and receive dual polarization signals in another application. In one exemplary implementation of both these applications, the units at each end may include a single modem card and a single ODU.

Various embodiments may allow flexibility to have a single modem, cable, and ODU ensemble for diversity combining in the modem from a set of signals carried on one cable. By mode switching in the modem and ODU may allow transport dual polar signals in the transmit and receive direction on one cable. Exemplary processes may also support transmit MIMO on one cable. In one example, the signals are separated in frequency and would use 126 MHz and 500 MHz for receive signals, and 311 MHz and 700 MHz for transmit signals. This arrangement may be capable of carrying 2 GB on one cable connected to one modem and ODU.

Figure 1:
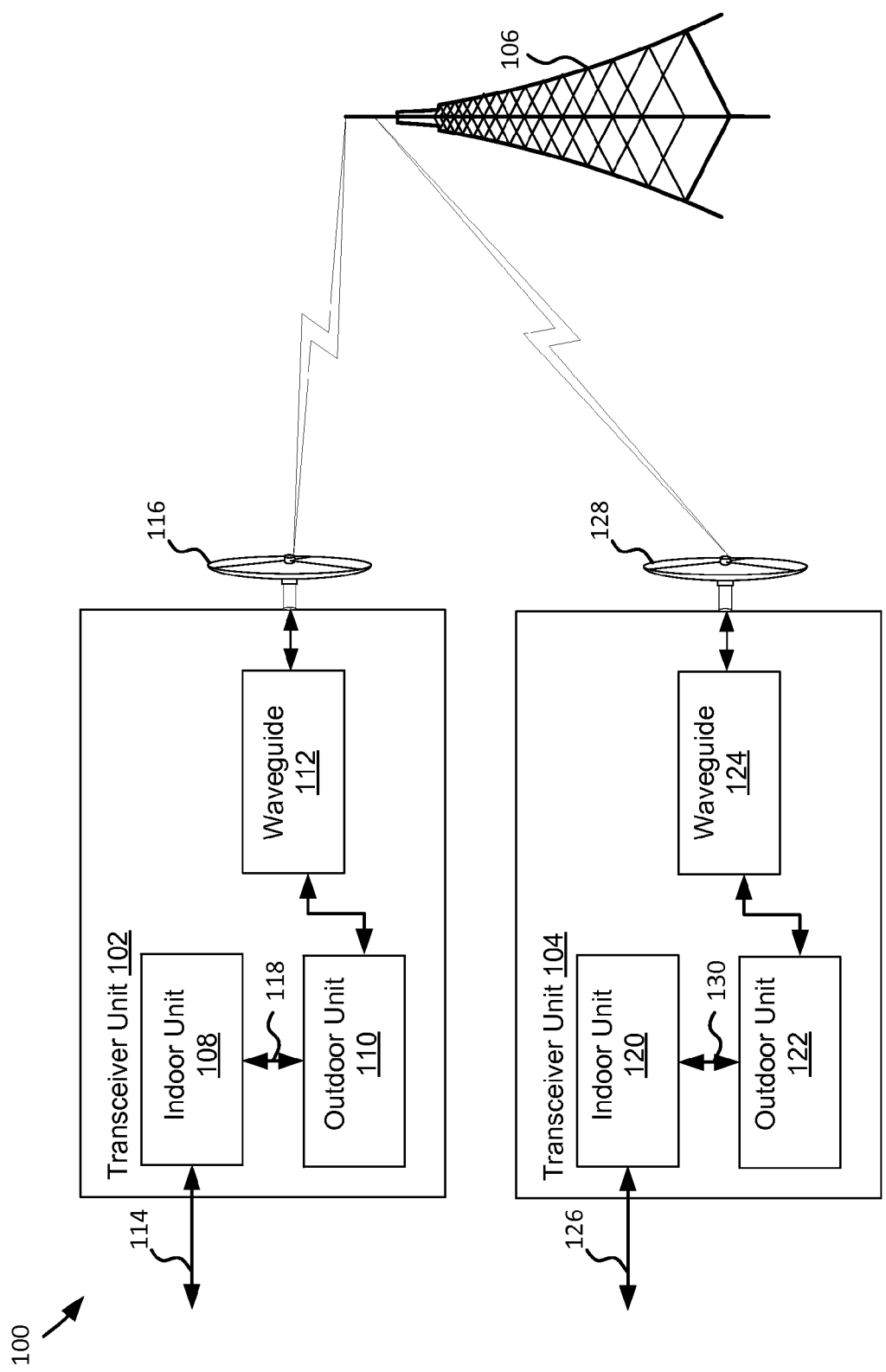
FIG. 1 depicts an environment including two transceiver units in some embodiments.

FIG. 1 is an environment 100 including two transceiver units 102 and 104 in some embodiments. Each of the transceiver units 102 and 104 are split mount radios. A split-mount radio has a part of the electronics mounted outdoors with an antenna and part indoors. The outdoor unit (ODU) may be the RF transmitter/receiver. In various embodiments, the indoor unit (IDU) contains a data access card (DAC) and a radio access card (RAC). The IDU may contain the modulator/demodulator, multiplexer, control, and traffic interface elements. The IDU and ODU may be coupled together using a cable or any other means.

By comparison, an all-indoor radio has all radio equipment installed inside and is connected to its antenna using a waveguide or coax feeder. A split-mount radio may be a point-to-point radio installation for licensed 6 to 38+ GHz frequency bands with the ODU direct-mounted to the rear of the antenna to provide an integral antenna feed. By having the ODU mounted with the antenna, split-mount may eliminate or reduce feeder losses, minimize or reduce rack occupancy, and/or lower installed costs compared to indoor radios.

For example, transceiver unit 102 may comprise an IDU 108 in communication with a processor and/or a digital device, an ODU 110 in communication with the IDU 108 over cables 118, a waveguide 112 in communication with the ODU 110, and an antenna 116. The IDU 108 may comprise a modulator/demodulator and control circuitry for providing data from a digital device or a processor over line 114 to the antenna 116 via the ODU 110 and/or the waveguide 112. Similarly, the IDU 108 may also be configured to receive information from the antenna 116 via the ODU 110 for providing to the digital device or processor via the line 114. The ODU 110 may comprise an RF transmitter/receiver and be coupled with the antenna 116. The waveguide 112 may or may not be a part of the ODU 110.

The IDU 108 of the transceiver unit 102 may be coupled to the ODU 110 utilizing a coaxial cable 118. Although only one coaxial cable 118 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

Similarly, transceiver unit 104 may comprise an IDU 120 in communication with a processor and/or a digital device, an ODU 122 in communication with the IDU 120 over cable 130, a waveguide 124 in communication with the ODU 122, and an antenna 128. The IDU 120 may comprise a modulator/demodulator and control circuitry for providing data from a digital device or a processor over line 126 to the antenna 128 via the ODU 122 and/or the waveguide 124. Similarly, the IDU 120 may also be configured to receive information from the antenna 128 via the ODU 122 for providing to the digital device or processor via the line 126. The ODU 122 may comprise an RF transmitter/receiver and be coupled with the antenna 128. The waveguide 124 may or may not be a part of the ODU 122.

The IDU 120 of the transceiver unit 104 may be coupled to the ODU 122 utilizing a coaxial cable 130. Although only one coaxial cable 130 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

Those skilled in the art will appreciate that the transceiver unit 104 may perform in a manner similar to the transceiver 102. In various embodiments, the two transceiver units 102 and 104 may be in communication with each other over a wireless communication tower 106. Those skilled in the art will appreciate that the transceiver units 102 and 104, individually or together, may communicate with any digital device or receiver.

The wireless communication tower 106 (e.g., cell tower or other microwave radio device) may be any device configured to receive and/or transmit wireless information.

Various embodiments may comprise a wireless communication system configured to transmit and receive orthogonally polarized signals or wireless communication systems with antenna spatial diversity. Multiple signals (e.g., multiple transmit and/or multiple receive signals) may be shared between an ODU and an IDU over a single cable utilizing systems and methods described herein. In some embodiments, multiple signals may be shared between an ODU and a modem over a single cable.

In some embodiments, wireless communication systems may utilize polarization diversity on a wireless channel to increase capacity or compensate for fading conditions. Some systems, for example, utilize a horizontally polarized signal and a vertically polarized signal on the same wireless channel to either increase capacity of communication or redundantly communicate data between communications sites when the same wireless channel is experiencing a fading condition. In a polarization diversity system, there may be two transmit signals (e.g., one transmit signal to be transmitted horizontally and one transmit signal to be transmitted vertically) as well as two receive signals (e.g., one receive signal received by the antenna as a horizontally polarized signal and one receive signal received by the same antenna as a vertically polarized signal).

Other wireless systems may utilize antenna spatial division. In these systems, multiple antennas may be utilized to provide redundancy in case of fading signal conditions. In one example, a main antenna may be utilized to receive a main signal and a diversity antenna may be utilized to receive a diversity signal. The diversity signal may be required if the main signal is faded or otherwise contains errors. In these systems, for example, multiple receive signals may be received (e.g., a main signal by the first antenna and a diversity signal by the second antenna) but only a single transmit signal may be transmitted.

In order to communicate multiple receive and/or transmit signals from the ODU to the modem, multiple coaxial cables may be used. In some embodiments, however, a single coaxial cable may be utilized in conjunction with a system of frequency division to maintain the receive and/or transmit signals between the ODU and IDU (or modem). Those skilled in the art will appreciate that any technique may be used to maintain or retain the signals across the single cable.

Figure 2:
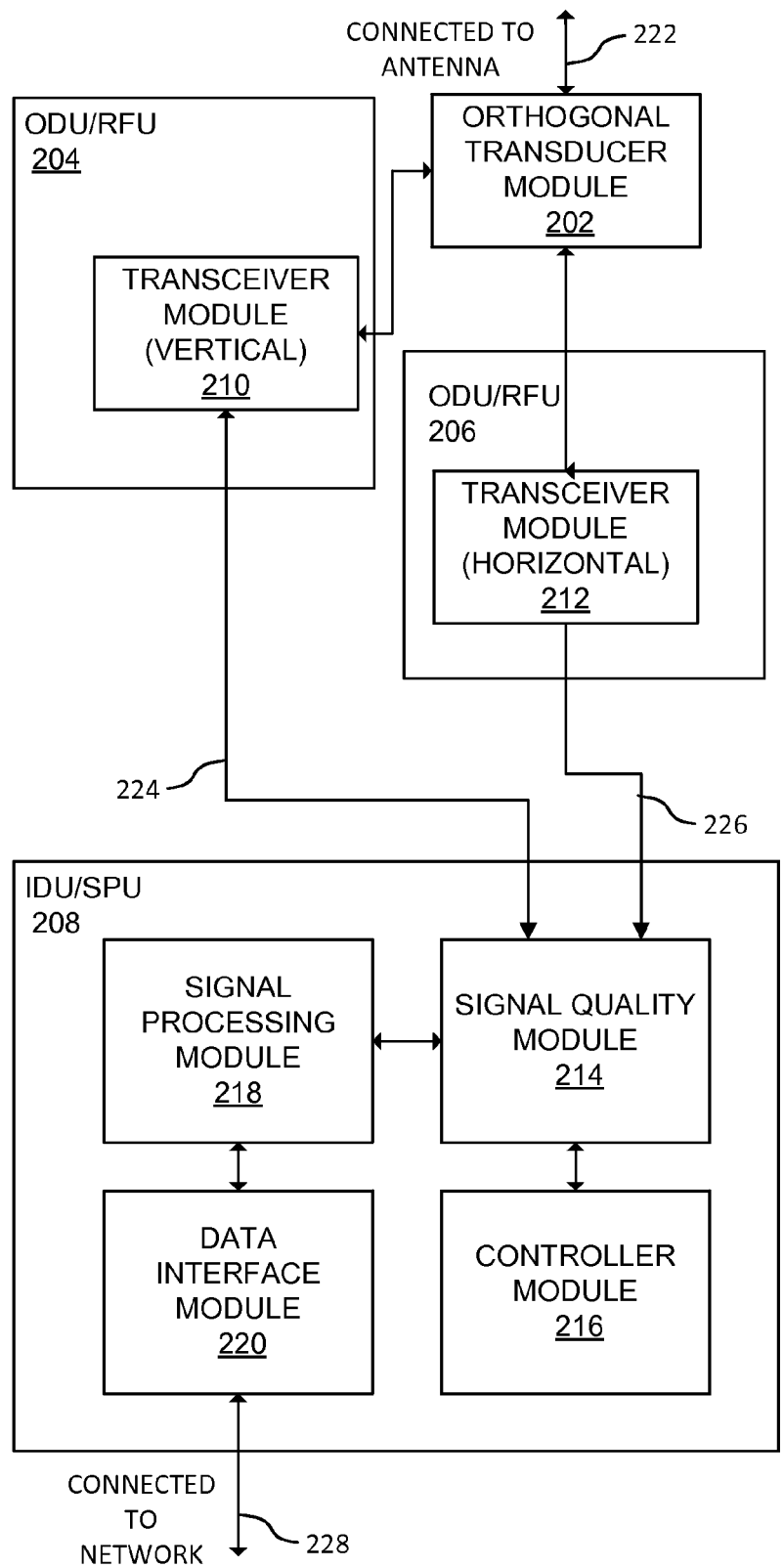
FIG. 2 is a block diagram regarding communication between two transceiver units in a communication system that utilizes orthogonal transmit and receive signals in some embodiments.

FIG. 2 depicts a microwave communication system that is configured to transmit and receive orthogonal systems utilizing multiple cables (i.e., without utilizing frequency division to transmit signals across the cables). In the system as depicted in FIG. 2, the orthogonal transducer module 202 is external to the two outdoor-unit/radio frequency units 204 and 206. Both outdoor-unit/radio frequency units 204 and 206 are separately coupled to the indoor unit/signal processing unit via a coaxial cable. Some embodiments described herein allow for communication between one or more outdoor-unit/radio frequency units with one or more indoor unit/signal processing units over a single cable by allowing frequency division of different receive and/or transmit signals.

At a high level, FIG. 2 is a block diagram regarding communication between two transceiver units in a communication system that utilizes orthogonal transmit and receive signals in some embodiments. FIG. 2 comprises two outdoor-unit (ODU)/radio frequency unit (RFU) 204 and 206 coupled to an orthogonal transducer module (OMT) 202. The OMT 202 is coupled to one or more antennas (not depicted). The ODU/RFU 204 comprises a transceiver module 210 configured to process signals that have been or will be vertically polarized (e.g., received signals that were vertically polarized and signals that are to be transmitted in a vertical polarization). Similarly, the ODU/RFU 206 comprises a transceiver module 212 configured to process signals that have been or will be horizontally polarized (e.g., received signals that were horizontally polarized and signals that are to be horizontally in a vertical polarization).

The OMT 202 is configured to route polarized signals to different signal paths based on polarization. In some embodiments, the OMT 202 is configured to polarize and depolarize signals. The OMT 202 may comprise an orthomode transducer and/or waveguide filters.

In one example, when a communications site is transmitting data, the OMT 202 receives modulated carrier signals from its respective transceiver modules 210 and 212, polarizes the modulated carrier signals according to the port designations (i.e., vertical polarization, and horizontal polarization), and provides the resulting polarized signals through the antenna. Conversely, when the communications site is receiving data, the OMT 202 receives polarized-diverse signals from the antenna and may depolarize the polarized-diverse signals, which may result in a modulated carrier signal for each polarized-diverse signal. These modulated carrier signals may be subsequently provided to transceiver modules 210 and 212 via ports that correspond to different polarized-diverse signals (e.g., the modulated carrier signal from the vertically polarized signal is provided to the transceiver 132 coupled to the vertical polarization port). In various embodiments, waveguide filters may both direct and convert the signals as necessary.

Each of the transceiver modules 210 and 212 is coupled to the IDU/SPU 208 via connections 224 and 226 which allows the transceivers to send and receive first and second data streams. Each of the transceiver modules 210 and 212 is also coupled to the OMT 202 through waveguide ports (e.g., rectangular waveguide ports). In some embodiments, these connections allow the transceivers 210 and 212 to send non-polarized carrier signals to, and receive depolarized carrier signals from, the OMT 202.

The transceiver modules 210 and 212 (and/or the signal processing module 218) may also modulate the data stream onto the carrier signal using a variety of data modulation schemes including, but not limited to, quadrature-amplitude modulation (QAM), phase-shift keying (PSK), frequency-shift keying (FSK), trellis coded modulation (TCM), and variations thereof.

Additionally, for some embodiments, the transceiver modules 210 and 212 (and/or the signal processing module 218) may further implement adaptive modulation schemes configured to adjust the data modulation of the data stream onto the carrier signals based on the conditions of the wireless channel. For example, when the wireless channel conditions between two communications sites change such that they adversely affect the vertically-polarized signal traveling over the wireless channel but not the horizontally-polarized signal, the transmitting communications site may adjust the data modulation of the carrier signal for the vertically-polarized signal from 256 QAM to 16 QAM. This change may be applied uniformly to the horizontally-polarized signal as well, or may be isolated to just the vertically-polarized signal. In some embodiments, the modulation change implemented by the adaptive modulation may be uniform across all carrier signals provided by the signal quality module 108, and not just isolated to the polarization-diverse signal that is adversely affected by the wireless channel conditions. Additionally, in various embodiments, the determination or activation of an alternative modulation at the transmitting communications site 102 may be determined remotely by the receiving communications site 120, which then instructs the transmitting communications site 102 of its determination.

The OMT 202 is coupled to an antenna via a connection (e.g., circular waveguide port) which allows the OMT 202 to transmit and receive polarized wireless signals using the antenna.

The IDU/SPU 208 comprises a signal quality module 214, a controller module 216, a signal processing module 218, and a data interface module 220. The signal quality module 214 is configured to combine and split data streams. For example, the signal quality module 214 may be configured to split data streams onto cables 224 and 226. Similarly, the signal quality module 214 may be configured to combine data streams from cables 224 and 226 and provide the combined data streams to the signal processing module 218.

Those skilled in the art will appreciate that a modem may comprise all or part of the signal quality module 214 and the signal processing module 218.

The signal processing module 218 is coupled to the data interface module 220 and the signal quality module 214. According to some embodiments, when the communications system is transmitting, the signal processing module 218 may be configured to convert data received from the data interface module 220 to a processed data stream, which is then provided to the signal quality module 214. When the communications system is receiving, the signal processing module 218 may be configured to convert a processed data stream received from the signal quality module 214 to a form that may be received and further processed by customer equipment.

The signal processing module 218 may be configured to process data for a number of purposes including, for example, conversion of data (e.g., converting between data and I-Q data), data compression, error correction, processing to further reduce of correlation between the polarization-diverse signals, filtering, and measuring data signals. For example, by processing the data stream received from the signal quality module 214, the signal processing module 218 may measure, or assist in the measurement, of the overall strength of a signal stream received by the antenna. Additionally, based on wireless channel conditions, the signal processing module 218 may be utilized to determine whether a power adjustment is warranted for one or more of the polarization-diverse signals being transmitted (e.g., increase power of the vertically or horizontally polarized signal), determine whether more data should be diverted to one polarization-diverse signal over another, determine whether one of the polarization-diverse signals should be disabled, or assist in adaptive modulation process (e.g., assist to determine the best modulation for one or both transceiver modules).

Measurement of signal strength may be used to determine whether a received signal meets a minimum receive signal level threshold. From this determination, a receiving communications site may determine whether the wireless channel on which a signal is received is experiencing a fading condition, and may inform the transmitting communications site accordingly. To address the fading condition, the transmitting communications site may transmit data such that polarization-diverse signals carry redundant data, thereby increasing the likelihood that data transmitted is successfully received by the receiving communications site. Depending on the embodiment, the transmitting communications site may transmit data redundantly when instructed to do so by the receiving communications site, or based on the transmitting communications site's own determination.

For some embodiments, information regarding wireless channel conditions is shared between the communications sites. In addition to sharing the measured strength of the signal received (e.g., as a received signal strength indicator [RSSI]), communications sites may gather and share other information regarding observed conditions, such as signal-to-noise (SNR) ratio over the wireless channel and telemetry data).

The signal quality module 214 is coupled to the signal processing module 218 and a controller module 216. The controller module 216 may be configured to control operation of the signal quality module 214 (e.g., how to split or combine data streams). In some embodiments, the signal quality module 214 may be configured to split a data stream received from the signal processing module 218 into two data streams, which are then sent to the ODU/RFU 204 or 206 via connections 224 and 226, respectively. In various embodiments, the signal quality module 214 may be configured to combine a two data streams received from an ODU/RFU 204 and 206, via connections 224 and 226, respectively, into one data stream, and provide the one data stream to the signal processing module 218 for processing.

Those of ordinary skill in the art would appreciate that in some embodiments, the signal quality module 214 may be replaced by a router module that routes signals to a passive splitter module and a passive combiner module. For example, in some embodiments, the passive combiner module may comprise a passive concatenator, and a passive redundancy comparator.

For some embodiments, when the wireless channel being utilized is no longer experiencing a fading condition, the transmitting communications site may configure itself to divide the original data stream into two or more data streams such that each of the data streams contains a different portion of the original data stream, and to transmit those two or more streams using the polarization-diverse signals such that each polarization-diverse signal carries different data. In order to receive the data, the receiving communications site may configure itself accordingly to combine the data streams extracted from received polarization-diverse signals, and create a single data stream.

For instance, the signal quality module 214 for the transmitting communications site may be instructed (by its respective control module 216) to split a first data stream and a second data stream from the original data stream, each of the first and second data streams containing mutually exclusive portions of data from the original data stream. Subsequently, each of the first and second data streams may be provided by the signal quality module 108 to the pair of transceiver modules 210 and 212—one data stream going to a transceiver (vertical) module 210, and the other data stream going to a transceiver (horizontal) module 212. Depending on the embodiment, the splitting process may divide the original data stream based on a number of criteria including, for example, data type, data block size, and priority of data.

In some embodiments, the receiving communications site may configure itself to receive different data on each of the polarization-diverse signals. For example, the signal quality module 214 may be instructed to concatenate portions of a first data stream received with portions of a second data stream received in order to create a single data stream comprising data from the transmitting communications site.

One of ordinary skill in the art would readily understand that where some embodiments implement point-to-point wireless communications (e.g., microwave/millimeter frequency communications system), bi-directional data transfer between two communications site may be facilitated using two or more separate wireless channels between the sites. Each wireless channel may have a different center frequency and carrying its own set of polarization-diverse signals.

As used herein, the term set may refer to any collection of elements, whether finite or infinite. The term subset may refer to any collection of elements, wherein the elements are taken from a parent set; a subset may be the entire parent set.

As used herein, the term module might describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of some embodiments are implemented in whole or in part using software, in some embodiments, these software elements can be implemented to operate with a digital device capable of carrying out the functionality described with respect thereto.

Figure 3:
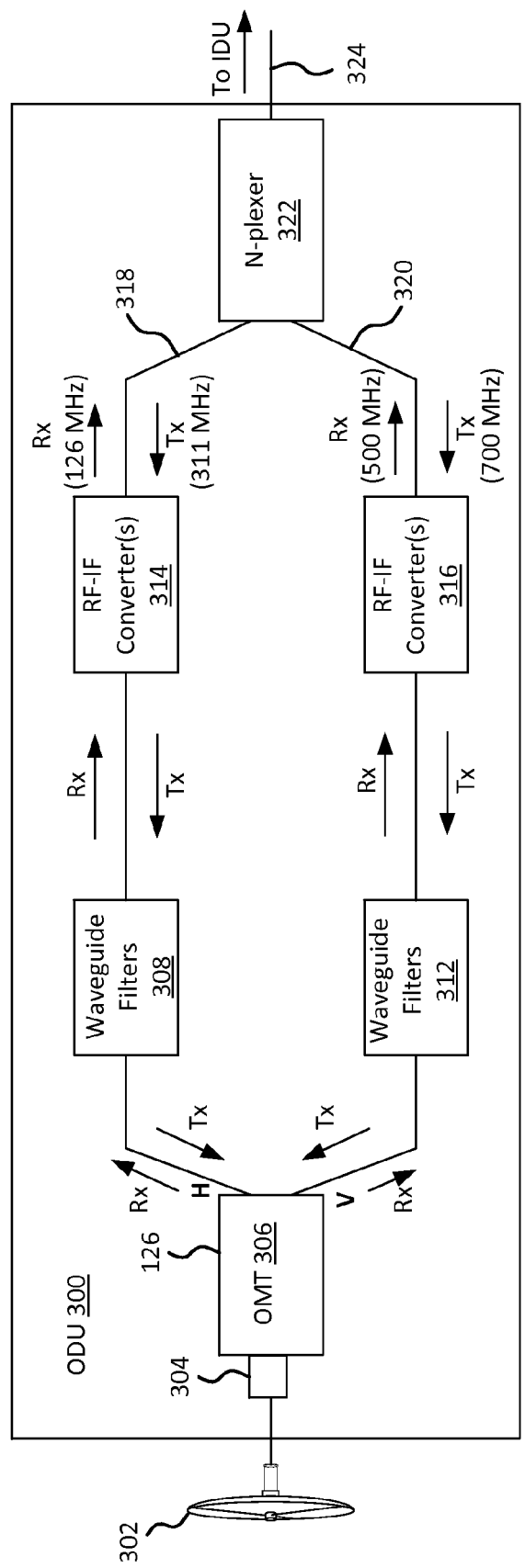
FIG. 3 depicts an exemplary embodiment of a wireless communication system to transmit and receive orthogonally polarized system between an ODU and an IDU (not depicted) over a coaxial cable in some embodiments.

FIG. 3 depicts an exemplary embodiment of a wireless communication system to transmit and receive orthogonally polarized system between an ODU 300 and an IDU (not depicted) over a coaxial cable 324 in some embodiments. In particular, FIG. 3 depicts an ODU 300 that provides multiple receive signals and receives multiple transmit signals over a single coaxial cable 324 to an IDU or modem.

The ODU 300 comprises a circular waveguide 304, an orthomode transducer (OMT) 306, waveguide filters 308 and 312, radio frequency (RF)—intermediate frequency (IF) converters 314 and 316, and N-plexer 322. The OMT 306 is coupled to the antenna 302 via the circular waveguide 304. The OMT 306 is also coupled to waveguide filters 308 and 312 via signal paths. The waveguide filters 308 and 312 are electrically coupled to RF-IF converter(s) 314, and 316, respectively. The N-plexer 322 is electrically coupled to the RF-IF converter(s) 314 and 316 via signal paths 318 and 320.

The N-plexer 322 is further electrically coupled to the IDU (not depicted) via the coaxial cable 324.

The antenna 302 may be any antenna used for communication. For example, the antenna 302 may be a parabolic antenna or any type of antenna. The antenna 302 may be part of a microwave communication system. In some embodiments, the antenna 302 is configured to receive polarized communication systems. There may be any number of antennas including, for example, different antennas for receiving differently polarized signals. For the purposes of this discussion, polarized signals are referred to as including horizontally polarized and vertically polarized. Those skilled in the art will appreciate that any orthogonal signals may be utilized.

The antenna 302 may be coupled with the OMT 306 via a circular waveguide 302. In some embodiments, the circular waveguide 302 is part of a resizable collar that may be mounted to or on the antenna 302. The waveguide 302 may be any waveguide kind or type of waveguide. For example, the waveguide 302 may be hollow or dielectric. In some embodiments, the waveguide 302 comprises a waveguide of any shape.

The OMT 306 is an orthomode transducer that may be coupled and/or include the circular waveguide 304. The OMT 306 may be a microwave circulator. In one example, the OMT 306 is a polarization duplexer. In various embodiments, the OMT 306 directs polarized signals. For example, the OMT 306 may receive a horizontally polarized receive signal and a vertically polarized receive signal from the antenna 302. The OMT 306 may direct the horizontally polarized receive signal to the waveguide filters 308 and direct the vertically polarized receive signals to the waveguide filters 312.

In some embodiments, the OMT 306 is contained within the ODU 300. By coupling the OMT 306 and/or the waveguide filters 308 and/or 312 within the same ODU 300 (e.g., within the same enclosure), ports and/or cabling between the components may be reduced thereby saving cost and reducing the parts necessary to install and maintain the system. In one example, the OMT 306 may be directly coupled to the waveguide filters 308 and 312 via a waveguide. The waveguide filters 308 and 312 may be electrically coupled (e.g., via signal paths) with RF-IF converter(s) 314 and 316, respectively.

Those skilled in the art will appreciate that, in some embodiments, the OMT 306 is not a part of the ODU 300 (e.g., the OMT 306 is outside of the ODU 300). The OMT 306 may be coupled to the ODU 300 in any number of ways. In one example, the circular waveguide 304, the OMT 306, and the waveguide filters 308 and 312 may be outside the ODU 300. The ODU 300 may be coupled to the external waveguide filters 308 and 312 in any number of ways including, for example, over a coaxial cable.

Although FIG. 3 may appear to depict a signal path between the waveguide filters 308 and 312 and the OMT 306, those skilled in the art will appreciate that the waveguide filters 308 and 312 may be coupled directly to the OMT 306 (e.g., via two or more rectangular waveguides).

Waveguide filters 308 and 312 may each be configured to filter and direct transmit and receive signals. The waveguide filters 308 and 312 may prevent receive signals from propagating back towards the antenna 302. Similarly, the waveguide filters 308 and 312 may prevent transmit signals from propagating back towards the transmitters or components of the transmitters (e.g., RF-IF converter(s) 314 and 316, respectively).

Each waveguide filter 308 and/or 312 may comprise a transmit filter and a receive filter. The transmit filter may be configured to receive signals from a transmitter and provide the signals to the antenna 302 via a stacked waveguide circulator component or OMT 306 (which may provide the signal to the antenna 302 via the circular waveguide 304). In one example, if a signal is provided through the transmit filter to the transmitter (e.g., a signal is provided from the antenna 302), the transmit filter may block the signal. Subsequently the signal may be returned or reflected back to a stacked waveguide circular or OMT 306 which may redirect the signal to the next port (e.g., the receive filter). The transmit filter is a filter that may reduce or eliminate undesired aspects (e.g., noise) of a signal to be transmitted from a transmitter to the antenna.

The receive filter may be configured to receive signals from an antenna 302 (via the stacked waveguide circulator component or OMT 306) and provide the signals to a receiver (which may comprise the RF-IF converter 314 or 316). In one example, if a receive signal is provided back towards the antenna 302, the receive filter may block the signal. Subsequently the signal may be returned or reflected to the RF-IF converter 314 or 316. The receive filter, like the transmit filter, may reduce or eliminate undesired aspects (e.g., noise) of a received signal from the antenna. The transmit filter and the receiver filter may be stacked and/or coupled.

In some embodiments, an SMA isolator is a SubMinitature version A (SMA) coaxial RF connector coupled between a waveguide filter and a transmitter or receiver. In one example, the SMA isolator may transmit microwave or radio frequency power in one direction. The SMA isolator may shield equipment. The SMA isolator may be coupled to the transmit filter and a transmitter. In another example, the SMA isolator is coupled to the receiver filter and a receiver.

In some embodiments, the SMA isolator prevents signals from being provided through the transmit filter back to the transmitter. If a signal is provided through the transmit filter to the transmitter, the SMA isolator may block the signal. Subsequently the signal may be returned or reflected back to the stacked waveguide circular or OMT 306 which may redirect the signal to the receive filter.

Although only an OMT 306, waveguide filters 308 and 312, RF-IF converter(s) 314 and 316, and N-plexer 322 are depicted as being contained within the ODU 300, those skilled in the art will appreciate that the ODU 300 may comprise any devices, circuits or components. For example, the RF-IF converter(s) may be a part of a transmitter, receiver, or both. In some embodiments, a transmitter may comprise predistorter modules configured to add predistortion to cancel or interfere with nonlinear artifacts generated by a power amplifier or the like. Similarly, the transmitter and/or receiver may comprise gain adjusters, phase adjusters, and/or filters for example.

The RF-IF converter 314 and 316 are any converters configure to upconvert or downconvert signals. In various embodiments, the RF-IF converters 314 comprise two different converters. For example, one of the RF-IF converters 314 may be configured to downconvert an RF transmit signal from the antenna 302 to IF. This RF-IF converter 314 may be considered as part of a transmitter. Another one of the RF-IF converters 314 may be configured to upconvert an IF receive signal from the N-plexer 322 to RF. This other RF-IF converter 314 may be considered as part of a receiver.

Those skilled in the art will appreciate that although FIG. 3 depicts RF-IF converter(s) 314 and 316, there may be receivers and transmitters or components associated with transmitting or receiving between the N-plexer 322 and the waveguide filters 308. For example, a first RF-IF converter 314 may be on a first signal path between the N-plexer 322 and the waveguide filters 308. A second RF-IF converter 314 may be on a second signal path between the N-plexer 322 and the waveguide filters 308. Similarly, two different RF-IF converters 316 may be on third and fourth signal paths, respectively, between the N-plexer 322 and the waveguide filters 308.

In various embodiments, a first RF-IF converter 314 is configured to convert a receive signal from the RF frequency to an intermediate frequency. A first RF-IF converter 316 may also be configured to convert a different receive signal from the RF frequency to a different intermediate frequency for frequency division. For example, the RF-IF converter 314 may convert the RF receive signal (received as a horizontally polarized signal by the antenna 302) to 126 MHz while the RF-IF converter 316 may convert a different RF receive signal (received as a vertically polarized signal by the antenna 302) to 500 MHz. Those skilled in the art will appreciate that the RF-IF converters 314 and 316 (or one or more other components of the ODU 300) may convert the two different receive signals to different frequencies to allow for frequency division and transmission over the coaxial cable 324.

Similarly, in various embodiments, a second RF-IF converter 314 is configured to convert a transmit signal from the IF frequency to an RF frequency. A second RF-IF converter 316 may also be configured to convert a different transmit signal from a different IF frequency to the RF frequency. In order to maintain two or more transmit signals over the coaxial cable, the transmit signals may have different frequencies. For example, the transmit signal received by the RF-IF converter 314 via signal path 318 may be 311 MHz while the transmit signal received by the RF-IF converter 316 via signal path 320 may be 700 MHz. Those skilled in the art will appreciate that the transmit signals may be at any frequency.

In some embodiments, the RF-IF converter 314 and RF-IF converter 316 may not convert a signal from RF to IF or from IF to RF, rather, the converters may convert a signal from RF to any frequency (e.g., baseband) and convert any frequency to RF.

The N-plexer 322 is a multi-band device that may be configured to direct or route multiple signals at different frequencies. For example, the N-plexer 322 may receive a receive signal at 126 MHz from RF-IF converter(s) 314 and a receive signal at 316 MHz from RF-IF converter(s) 316. The N-plexer 322 may direct both receive signals over the single cable 324.

The N-plexer 322 may also receive multiple transmit signals at different frequencies and route the transmit signals. For example, the N-plexer 322 may receive a transmit signal at 311 MHz and route the transmit signal to path 318. Similarly, the N-plexer 322 may receive a transmit signal at 700 MHz and route the transmit signal to path 320. The N-plexer 322 may route a plurality of signals based on frequencies of the signals.

Although signal path 318 is depicted as a signal path, those skilled in the art will appreciate that the signal path 318 may be multiple paths (e.g., the signal path 318 may comprise two separate signal paths electrically coupled to different converters of the RF-IF converters 314, respectively). Similarly, although signal path 320 is depicted as a single path, the signal path 320 may also be multiple paths (e.g., the signal path 320 may comprise two separate signal paths electrically coupled to different converters of the RF-IF converters 316, respectively). Multiple signal paths coupled to the N-plexer 322 are further discussed with regard to FIG. 4.

Although an N-plexer 322 is depicted in FIG. 3, those skilled in the art will appreciate that any device, circuit(s), and/or component(s) may be configured to maintain and/or propagate multiple signals across cable 324 without interfering the signals or the signals interfering with each other.

The coaxial cable 324 couples the ODU 300 and a modem or the IDU (not depicted in FIG. 3. The coaxial cable 324 is not limited to coax but may be any cable or combination of cables.

Figure 4:
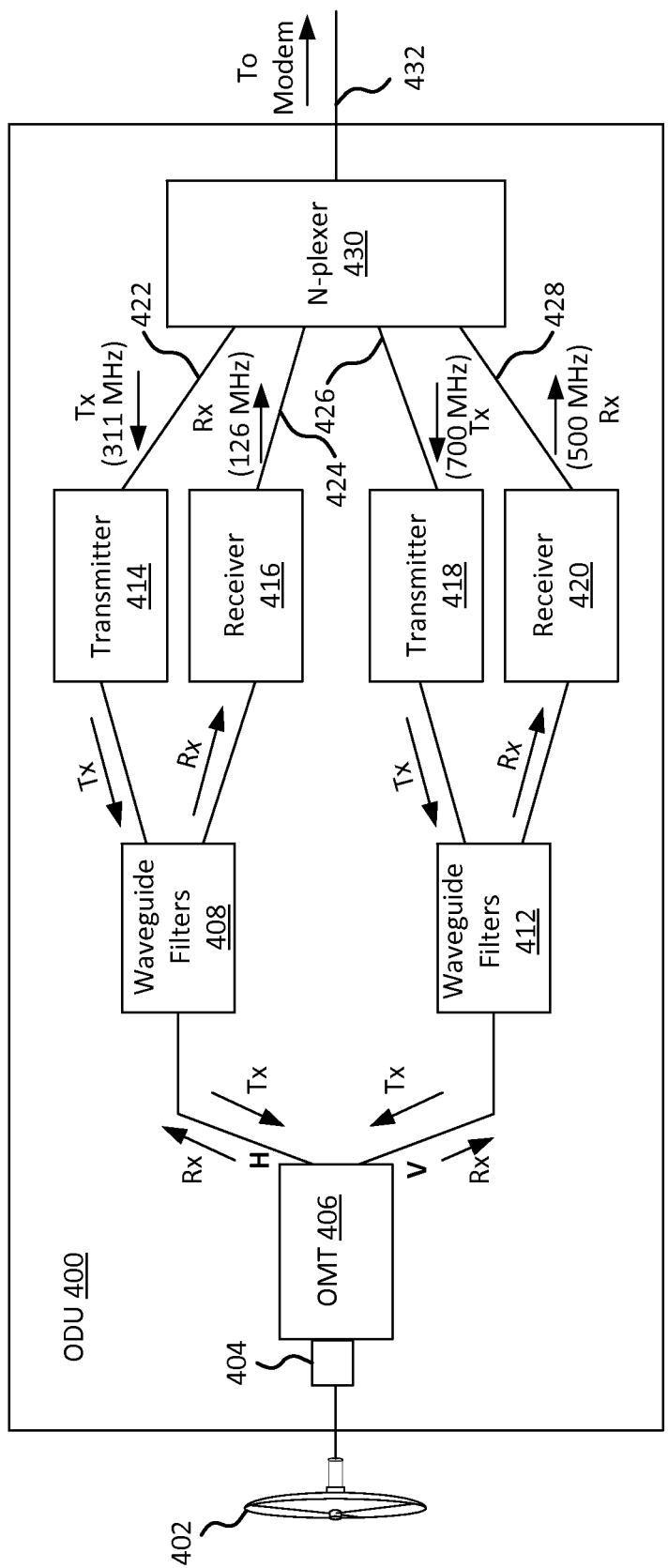
FIG. 4 depicts a different exemplary embodiment of a wireless communication system to transmit and receive orthogonally polarized signals between receivers/transmitters and a modem in some embodiments.

FIG. 4 depicts a different exemplary embodiment of a wireless communication system to transmit and receive orthogonally polarized signals between receivers/transmitters and a modem in some embodiments. FIG. 4 depicts an ODU 400 which is coupled to an antenna 402 and a cable 432. Although FIG. 4 depicts an ODU 400 or an enclosure housing similar equipment to an ODU, those skilled in the art will appreciate that the ODU 400 may be include one or more units. Further, the components of the ODU 400 may be housed in different enclosures. In some embodiments, one or more of the components of the ODU 400 may not be enclosed.

Similar to ODU 300, the ODU 400 comprises a circular waveguide 404, an orthomode transducer (OMT) 406, and waveguide filters 408 and 412. Waveguide filters 408 may be coupled to transmitter 414 and receiver 416 over separate signal paths. Similarly, the waveguide filters 412 may be coupled to transmitter 418 and receiver 420 over separate signal paths.

Transmitter 414 and receiver 416 may be electrically coupled to the N-plexer 430 via signal paths 422 and 424, respectively. Transmitter 418 and receiver 420 may also be electrically coupled to the N-plexer 430 via signal paths 426 and 428, respectively. The N-plexer 430 is further electrically coupled to a modem or IDU (not depicted) via the cable 432.

The antenna 402 may be similar to the antenna 302. For example, the antenna 402 may be a parabolic antenna or any type of antenna that, in this example, is configured to transmit and receive polarized communication systems.

The antenna 402 may be coupled with the OMT 406 via a circular waveguide 402. Like the OMT 306, the OMT 406 is an orthomode transducer that may be coupled and/or include the circular waveguide 404. The OMT 406 may be a microwave circulator. In one example, the OMT 406 is a polarization duplexer.

Waveguide filters 308 and 412, similar to waveguide filters 308 and 312, may each be configured to filter and direct transmit and receive signals. The waveguide filters 408 and 412 may prevent receive signals from propagating back towards the antenna 402. Similarly, the waveguide filters 408 and 412 may prevent transmit signals from propagating back towards the transmitters 414 and 418, respectively.

The transmitters 414 and 418 are any components configured to process and/or convert signals to an RF or any frequency to be transmitted by the antenna 402. The transmitter 414 may receive a transmit signal at 411 MHz from N-plexer 430 via signal path 422. The transmit signal may ultimately be transmitted by the antenna 402 as a horizontally polarized signal. The transmitter 414 may upconvert the received transmit signal to an RF frequency and provide the processed, upconverted transmit signal to the waveguide filters 408. The transmitter 418 may receive a transmit signal at 700 MHz from N-plexer 430 via signal path 426. The transmit signal may ultimately be transmitted by the antenna 402 as a vertically polarized signal. The transmitter 418 may upconvert the received transmit signal to an RF frequency and provide the processed, upconverted transmit signal to the waveguide filters 412.

The receivers 416 and 420 are any components configured to process and/or convert signals from an RF to an IF, baseband, or any frequency to be provided to the modem (not depicted) via the cable 432. The receivers 416 and 420 may convert receive signals (e.g., horizontally polarized signals and vertically polarized signals received by the antenna 402) from an RF frequency to different frequencies that will allow the N-plexer 430 to provide the converted receive signals over the cable 432.

The receiver 416 may receive a receive signal from the waveguide filters 408 and convert the receive signal to 126 MHz which may be provided to the N-plexer 430 via signal path 422. The receive signal may have been received by the antenna 402 as a horizontally polarized signal. Similarly, the receiver 420 may receive a receive signal from the waveguide filters 412 and convert the receive signal to 500 MHz which may be provided to the N-plexer 430 via signal path 428. The receive signal may have been received by the antenna 402 as a vertically polarized signal.

The N-plexer 430 may be similar to the N-plexer 322. The N-plexer 430 is a multi-band device that may be configured to direct or route multiple signals at different frequencies. For example, the N-plexer 430 may receive a receive signal at 126 MHz from receiver 416 via signal path 424 and receive a receive signal at 500 MHz from receiver 420 via signal path 428. The N-plexer 430 may direct both receive signals over the single cable 432.

The N-plexer 430 may also receive multiple transmit signals at different frequencies and route the transmit signals. For example, the N-plexer 430 may receive a transmit signal at 311 MHz from the single cable 432 and route the transmit signal over signal path 422. Similarly, the N-plexer 430 may receive a transmit signal at 700 MHz and route the transmit signal to path 426. The N-plexer 430 may route a plurality of signals based on frequencies of the signals.

Figure 5:
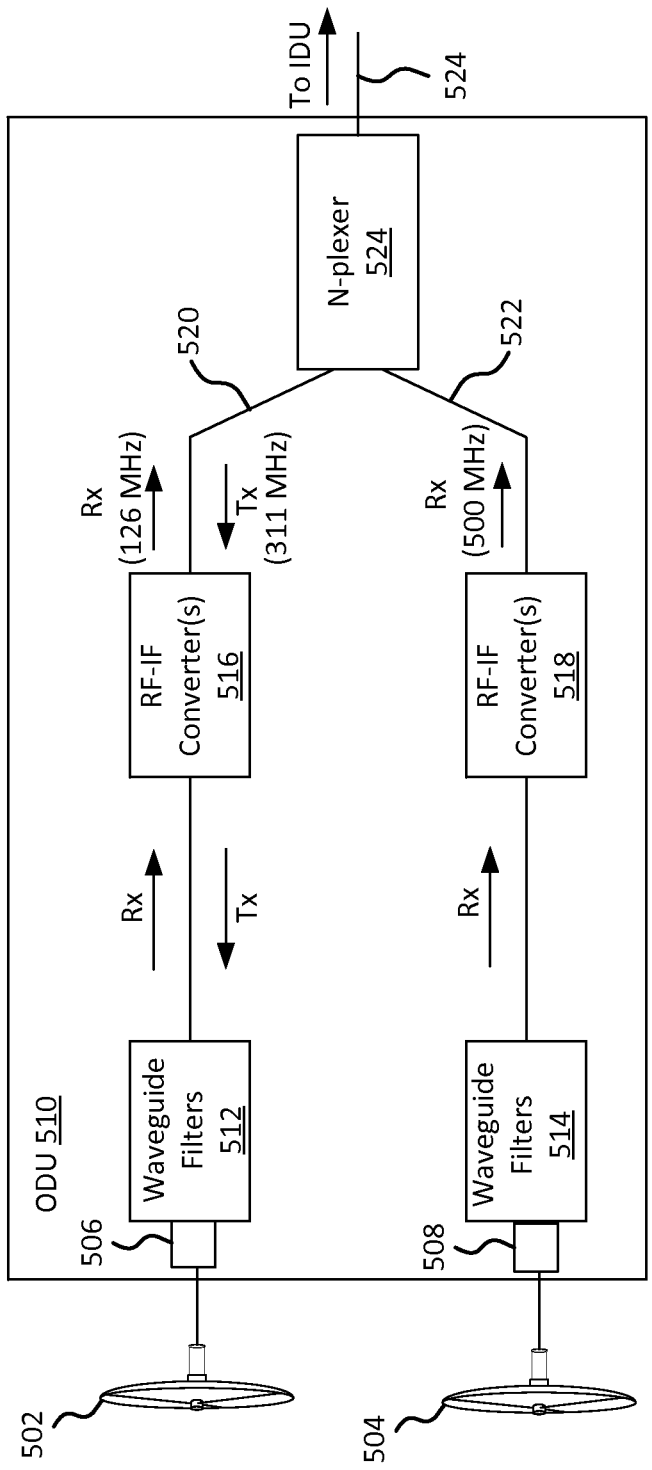
FIG. 5 is a block diagram of another ODU in a communication system that utilizes antenna spatial diversity in some embodiments.

FIG. 5 is block diagram of another ODU 510 in a communication system that utilizes antenna spatial diversity in some embodiments. The ODU 510 may be in communication with main antenna 502 and diversity antenna 504. In various embodiments, two receive signals, including a main receive signal and a diversity receive signal, may be received by the ODU 510. The diversity receive signal may be utilized to correct the main receive signal if the main receive signal is weak or otherwise in error due to a fading channel. In some embodiments, only the main antenna 502 is utilized for transmitting signals from the ODU 510. In this example, the ODU 510 may provide a single transmit signal to the main antenna 502 and receive two receive signals from the main antenna 502 and diversity antenna 504.

The ODU 510 may comprise circular waveguides 506 and 508 coupled to waveguide filters 512 and 514, respectively. The RF-IF Converter(s) 516 and 518 may be electrically coupled to the waveguide filters 512 and 514, respectively. The RF-IF Converter(s) 516 and 518 may be coupled to the N-plexer 524 via signal paths 520 and 522, respectively. The circular waveguides 506 and 508, waveguide filters 512 and 514, RF-IF Converter(s) 516 and 518, and N-plexer 524 may be similar to the circular waveguides, waveguide filters, RF-IF Converter(s) and N-plexer of FIGS. 3 and 4.

In various embodiments, the N-plexer 524 may receive a transmit signal from the cable 524 to provide to the main antenna 502 (e.g., via signal path 520). The transmit signal may be at a different frequency than the frequency of the receive signals or any other signal on the cable 524. For example, the frequency of the transmit signal may be 311 MHz while the receive signals may be 126 MHz and 500 MHz, respectively.

In various embodiments, the cable 524 may provide multiple receive and/or transmit signals as well as power and/or telemetry. The N-plexer 524 and another N-plexer (see FIG. 6) may be electrically coupled via the cable 524. The N-plexers may provide signals to the cable 524 as well as direct signals from the cable 524 to a particular signal path based on the frequency of the signal (e.g., each signal on the cable 524, including but not limited to receive signals, transmit signals, power signals, and telemetry signals, may each have a unique frequency to take advantage of frequency division).

Those skilled in the art will appreciate that power may be provided by any power module over the cable to the ODU 510 and/or one or more components for the ODU 510. The power module may, for example, provide DC power to the ODU 510.

The telemetry signal may include data that is used to communicate between components of the IDU (e.g., modem) and the ODU 510. For example, in some split-mount embodiments, a radio frequency (RF) signal (e.g., microwave frequency signal) may be downconverted to an IF frequency and subsequently received at the IDU (e.g., at a modem). Errors or signal corrections may be identified by one or more components of the IDU. An error detection module in the IDU may be transmitted back to the ODU 510 as telemetry data, which the ODU 510 translates into adjustments which may, for example, be applied (e.g., the RF signal may be demodulated, phase corrected based on the telemetry data, and remodulated within the ODU 510).

Figure 6:
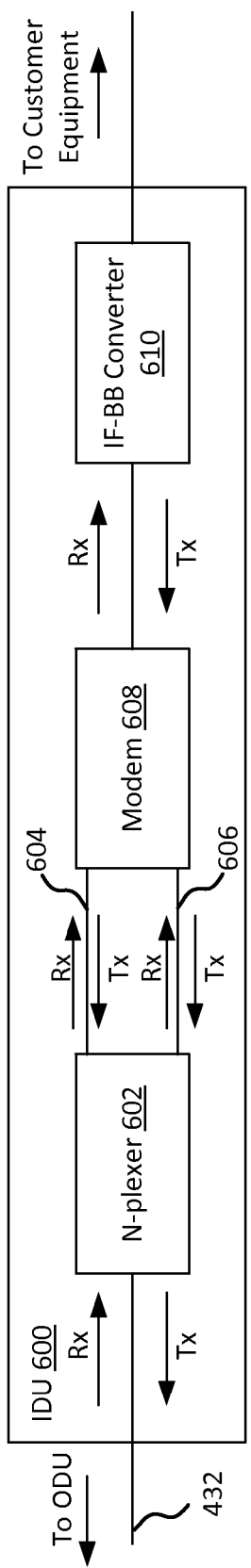
FIG. 6 is a block diagram of an IDU that communicates with an ODU over a single cable in some embodiments.

FIG. 6 is block diagram of an IDU 600 that communicates with an ODU over a single cable 432 in some embodiments. The IDU 600 may be any unit configured to communicate with the ODU 400 over the cable 432. Although FIG. 6 identifies an IDU 600, those skilled in the art will appreciate that systems and methods described herein may, in some embodiments, be utilized with an N-plexer and a modem that communicates with a separate unit over the cable 432.

The IDU 600 may comprise an N-plexer 602 electrically coupled with the cable 432 and a modem 608. The modem 608 may further be coupled with the IF-BB converter 610 which may be in communication with customer premises equipment. Those skilled in the art will appreciate that the IDU 600 may comprise any number of components, including, for example, a power module and a telemetry module. The power module may be configured to provide power to the ODU 400 via the cable 432. The telemetry module may be configured to detect and correct for errors in received signals and provide corrective information to the ODU 400 via the cable 432. Further, the IDU 600 may comprise gain adjusters, filters, and/or phase adjusters, or the like.

In some embodiments, the components of the IDU 600 may be in any order. In some embodiments, the IF-BB converter 610 may be coupled to the N-plexer 602 and the modem 608. For example, the IF-BB converter 610 may be configured to downconvert diversity receive signals received from the N-plexer 602 before providing the downconverted diversity receive signals to the modem 608. Similarly, the IF-BB converter 610 may upconvert diversity transmit signals to different frequencies. The IF-BB converter 610 may receive the diversity transmit signals from the modem 608 and provide the upconverted signals to the N-plexer 602.

In various embodiments, the N-plexer 602 may direct diversity receive signals from the cable 432 to the signal path 604 or signal path 606 based on the different frequencies of the two diversity receive signals. The N-plexer 602 may also receive transmit signals from the modem 608. The diversity transmit signals may each have different frequencies than each other and different frequencies than the diversity receive signals. In some embodiments, the N-plexer 602 receives the two transmit signals via two other signal paths (e.g., other than the signal paths 604 and 606). For example, there may be four signal paths between the modem 608 and the N-plexer 602. Each different signal path may be for a different receive or transmit signal. Those skilled in the art will appreciate that there may be any number of signals and corresponding signal paths between the modem 608 and the N-plexer 602.

The modem 608 may be any modem configured to demodulate diversity receive signals and modulate diversity transmit signals (e.g., upconverted signals to be transmitted received from the customer equipment). In various embodiments, the modem 608 converts the modulated diversity transmit signals to different frequencies (e.g., 311 MHz and 700 MHz, respectively).

The IF-BB converter 610 may be any converter configured to upconvert signals to be transmitted received from customer equipment (e.g., from a baseband to an IF frequency) and downconvert signals received from the modem 608 (e.g., demodulated receive signals from IF frequency to a baseband frequency). In various embodiments, the IF-BB converter 610 converts the signals to be transmitted to different frequencies (e.g., 311 MHz and 700 MHz, respectively). Although the IF-BB converter 610 is identified as "IF-BB," the IF-BB converter 610 may upconvert signals to be transmitted to any frequency (not just IF) and the IF-BB converter 610 may downconvert signals to any frequency (not just baseband). The IF-BB converter 610 may be optional.

In various embodiments, there may any number of signal paths between the modem 608 and the IF-BB converter 610. For example, the IF-BB converter 610 may provide upconverted transmit signals (which each have frequencies distinct from each other) to the modem 608 over two different signal paths. The modem 608 may provide demodulated receive signals to the IF-BB converter 610 over one or two other signal paths.

In various embodiments, the IDU 600 or second unit may include a power module configured to provide power to the ODU 400. For example, the power module may provide a power signal to the N-plexer 602. The N-plexer 602 may provide the power signal to the single cable 432. Since the power signal may be DC power, the frequency of the power signal is different (e.g., 0 Hz) from that of other signals that may be propagating on the cable 432. As a result, the N-plexer 430 of FIG. 4 may receive the power signal from the cable and provide the power signal to the correct path to power the ODU 400.

Further, the IDU 600 or second unit may include a telemetry module configured to provide a telemetry signal to the ODU 400 to allow for communication between the two units. The telemetry signal may be at a frequency that is different than other signals propagating across the single cable 432. For example, the telemetry module may provide a telemetry signal to the N-plexer 602. The N-plexer 602 may provide the telemetry signal to the single cable 432. Since the frequency of the telemetry signal is different (e.g., 5 MHz) from that of other signals that may be propagating on the cable 432, the N-plexer 430 of FIG. 4 may receive the telemetry signal from the cable and provide the telemetry signal to the correct path to allow for communication.

In various embodiments, the IDU 600 may comprise a signal quality module, controller module 216, signal processing module 218, and/or a data interface module 220 as discussed in FIG. 2. In various embodiments, the signal quality module 214 and/or the signal processing module 218 may apply a receive signal from a diversity antenna (in an antenna spatial diversity system) when errors are detected. In some embodiments, the receive signal from the diversity antenna may be disregarded (e.g., when the quality of the receive signal from the main antenna is high or above a threshold).

Although a single cable 432 is depicted in FIGS. 3-6, those skilled in the art will appreciate that any number of cables may be utilized. For example, multiple signals at different frequencies may propagate through any of the cables utilizing systems and methods described herein.

Figure 7:
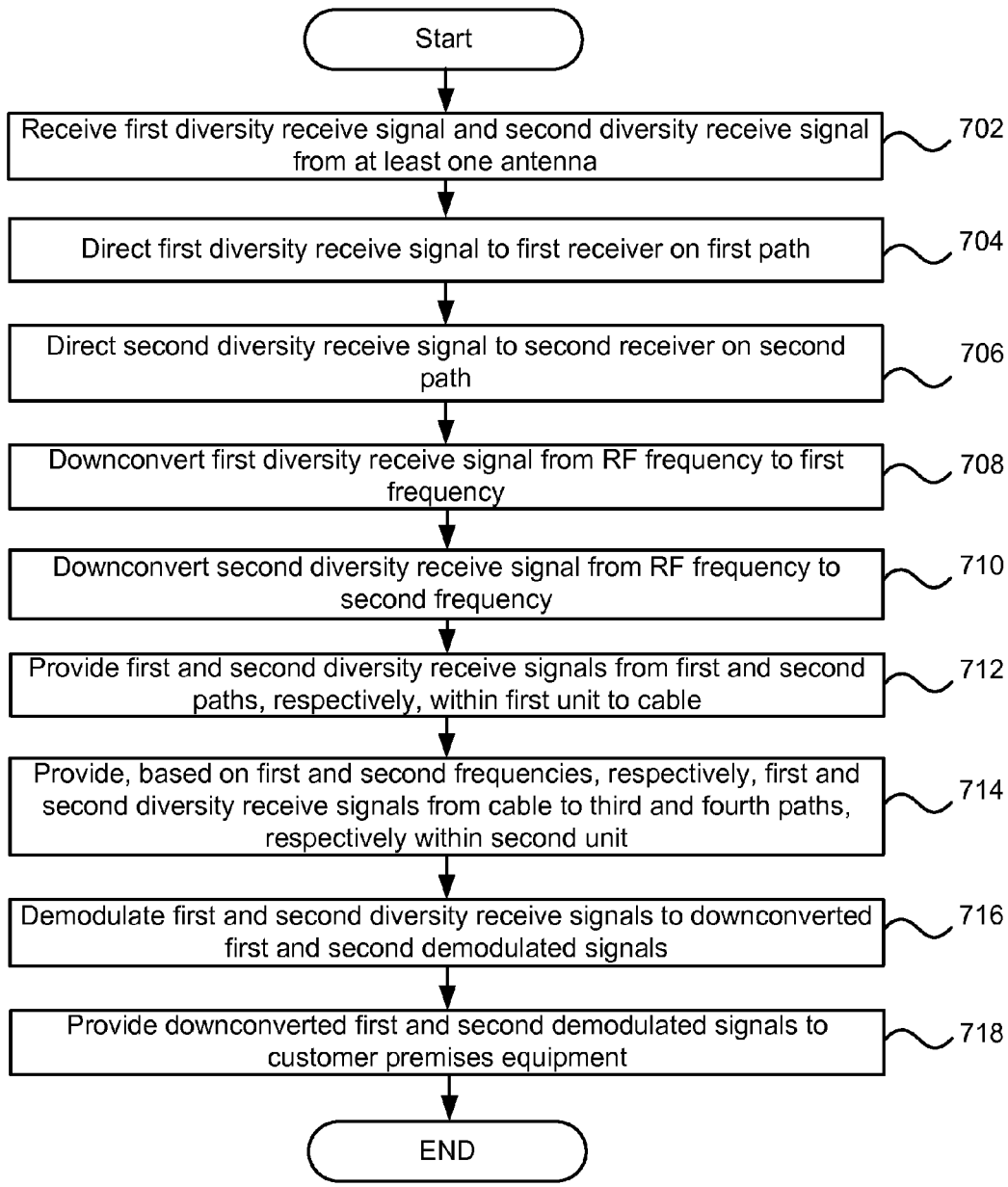
FIG. 7 is a flow diagram for processing two or more receive signals over a split mount system utilizing a single cable in some embodiments.

FIG. 7 is a flow diagram for processing two diversity receive signals over a split mount system utilizing a single cable in some embodiments. In step 702, at least one antenna receives a first diversity receive signal and a second diversity receive signal. In some embodiments, the first and second diversity receive signals have orthogonal polarizations and may be received by a single antenna.

Although polarization systems are discussed regarding FIG. 7, various systems and methods described herein may apply to main and diversity receive signals received by two spatially diverse antennas, respectively. Those skilled in the art will appreciate that any number of diversity receive signals may be received over any number of antennas.

In step 704, an OMT 406 within an ODU 400 may receive orthogonally polarized first and second diversity receive signals from the antenna 402 via a circular waveguide 404 and provide the first diversity receive signal to waveguide filters 408 via a first path (e.g., rectangular waveguide coupling the OMT 406 to the waveguide filters 408). In step 706, the OMT 406 may provide the second diversity receive signal to waveguide filters 412 via a second path (e.g., a different rectangular waveguide coupling the OMT 406 to the waveguide filters 412). In various embodiments, the OMT 406 may route the first and second diversity receive signals to the waveguide filters 408 and 412, respectively, based on the polarization of the signals.

In some embodiments of an antenna diversity system, the main antenna may provide the first diversity receive signal to a first receiver on a first path and the diversity antenna may provide the second diversity receive signal to a second receiver on a second path.

In step 708, a receiver 416 may receive and downconvert the first diversity receive signal from an RF frequency to a first frequency. In some embodiments, the first diversity receive signal may be provided to the receiver 416 from the waveguide filters 408. The receiver 416 may process (e.g., filter, adjust the gain, adjust phase, and/or remodulate the first diversity receive signal) as well as downconvert the first diversity receive signal. In some embodiments, the first diversity receive signal may be downconverted to an IF frequency.

In step 710, a receiver 420 may receive and downconvert the second diversity receive signal from an RF frequency to a second frequency. In a manner similar to step 708, the first diversity receive signal may be provided to the receiver 420 from the waveguide filters 412. The receiver 420 may process (e.g., filter, adjust the gain, adjust phase, and/or remodulate the second diversity receive signal) as well as downconvert the second diversity receive signal.

In some embodiments, the second diversity receive signal may be downconverted to an IF frequency that is at a different frequency than the downconverted first diversity receive signal. For example, the first diversity receive signal may be downconverted to 126 MHz and the second diversity receive signal may be downconverted to 500 MHz.

In step 712 and 714, the N-plexer 430 may receive the first diversity receive signal from the receiver 416 via signal path 424 and may receive the second diversity receive signal from the receiver 420 via signal path 428. The N-plexer 430 may provide both signals to the single cable 432 to provide the signals to a modem or other unit.

Those skilled in the art will appreciate that the cable may simultaneously propagate multiple signals at different frequencies. The N-plexer 430 of the ODU 400 and the N-plexer 602 of the IDU 600, for example, may be configured to route signals from the single cable 432 based on the different frequencies of the propagating signals. For example, the single cable 432 may simultaneously propagate six or more signals including, for example, two transmit signals to be transmitted by the ODU, two receive signals to be demodulated by the IDU, a power signal to power the ODU, and a telemetry signal to allow for communication between the two units. As a result, few cables between the two units may be utilized thereby reducing complexity, saving costs, and reducing ports and cables within the system.

In step 714, the N-plexer 602 of FIG. 6 provides first and second diversity receive signals from the cable to first and second signal paths within the second unit (e.g., IDU 600). The IDU 600 or second unit may be any unit with a modem (e.g., modem 608). The N-plexer 602 may provide the first and second diversity receive signals from the cable to the first and second signal paths based on the frequencies of the signals.

In step 716, the modem 608 may demodulate the first and second diversity receive signals received from the first and second signal paths to generate the first and second demodulated signals. In some embodiments, the first and second demodulated signal may contain different data. In other embodiments, one of the two signals is to provide error correction caused by distortion, interference, and/or fading conditions. In some embodiments, the modem 608 may provide a single corrected demodulated signal, provide two demodulated signals, or provide a single demodulated signal with information from both receive signals (e.g., for increased capacity).

In step 718, an IF-BB converter 610 may downconvert signals received from the modem 608. In one example, the IF-BB converter 610 may downconvert the signals to a baseband frequency or any frequency. In step 720, the downconverted signal(s) are provided to customer premises equipment.

Figure 8:
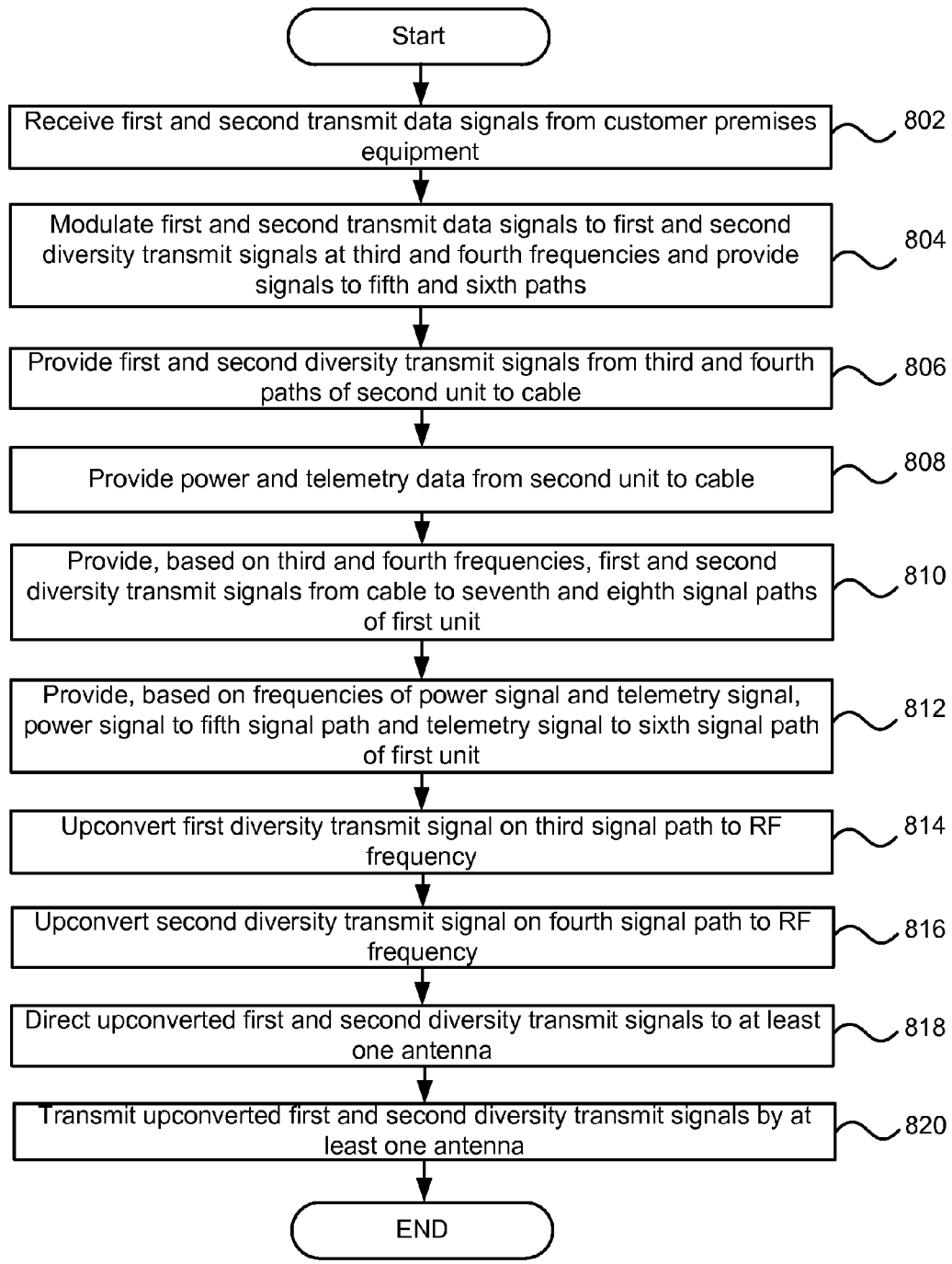
FIG. 8 is a flow diagram for transmitting two diversity transmit signals over a split mount system utilizing a single cable in some embodiments.

FIG. 8 is a flow diagram for transmitting two diversity transmit signals over a split mount system utilizing a single cable in some embodiments. In step 802, the IDU 600 receives first and second transmit data from customer premises equipment. Those skilled in the art will appreciate that any unit or modem may receive the first and second transmit data. In some embodiments, a single data signal from the customer premises equipment may be split into the first and second transmit data.

In step 804, the IF-BB converter 610 may upconvert signals to be transmitted which were received from customer premises equipment. In one example, the IF-BB converter 610 may upconvert the signals to an IF frequency or any frequency.

In some embodiments, the BB-IF converter 610 upconverts two transmit signals to different frequencies (e.g., a first transmit frequency may be upconverted to 311 MHz while the second transmit frequency may be upconverted to 700 MHz). The two signals may be provided over multiple paths to the modem 608.

In step 806, the modem 608 modulates the first and second transmit data to first and second diversity transmit signals and provides the signals to first and second signal paths. In some embodiments, there may be four signal paths between the N-plexer 602 and the modem 603 which may allow for propagation of two receive signals and two transmit signals on different signal paths. The N-plexer 602 may be coupled to any number of signal paths including, for example, additional signal paths for power and/or telemetry.

In various embodiments, the modem 608 converts the frequencies of the two upconverted transmit signals from the IF-BB converter 610 to two different frequencies. For example, the modem 608 may adjust the frequency of the first and/or second transmit signals to make the frequencies different from one another and/or different from signals that may propagate on the cable 432.

In step 808, the N-plexer 602 provides first and second diversity transmit signals from the modem to the cable 432. In step 810, the N-plexer 602 also provides power and/or telemetry data from the second unit (e.g., IDU 600) to the cable 432.

In step 812, the N-plexer 430 of the ODU 400 may provide the first and second diversity transmit signals from the cable 432 to the seventh and eighth signal paths of the ODU 400. As discussed herein, the N-plexer 430 may route the signals based on their distinct frequencies.

In step 814, the N-plexer 430 may provide the power signal and telemetry signal to the fifth and sixth signal paths, respectively, of the ODU 400 based on the distinct frequencies of the power and telemetry signals.

In step 816, the transmitter 414 may upconvert the first diversity transmit signal from the fifth signal path to a transmit RF frequency. Similarly, in step 818, the transmitter 418 may upconvert the second diversity transmit signal from the sixth signal path to the RF frequency.

In step 820, the upconverted first and second diversity transmit signals are directed to at least one antenna. For example, the waveguide filters 408 may receive the first upconverted diversity transmit signal from the transmitter 414 and provide the signal to the OMT 406. Similarly, the waveguide filters 412 may receive the second upconverted diversity transmit signal from the transmitter 418 and provide the signal to the OMT 406. The OMT 406 may horizontally polarize the upconverted first transmit signal and vertically polarize the upconverted second transmit signal.

In step 822, the at least one antenna (e.g., antenna 402) may transmit the orthogonally polarized transmit signals.

The above-described functions may be performed in hardware. In one example, the functions may be performed by one or more field-programmable gate arrays (FPGAs), discrete hardware, and/or one or more application-specific integrated circuits (ASICs).

Some embodiments address problems related to providing multi-carrier radios capable of Gigabit capacities. Radios of this type are normally indoor-mounted and coupled to an antenna mounted on a large tower over long lengths of expensive waveguides.

In various embodiments, cable, instead of waveguides, couple an indoor unit (IDU) with a modem to an outdoor mounted radio (e.g., an outdoor unit or ODU) in a split-mount configuration. In one example, the cable (e.g., coaxial cable) may carry multiple signals that may be used to provide diversity or cross pole signal capabilities. Signals carried by the radio may be multi-carrier in nature and, as such, may be organized for high capacity.

The design may allow four or more outdoor units (ODUs) to be coupled to two or more cross pole antennas and take advantage of space diversity and/or polarization diversity. Some embodiments allow the option to increase capacity through cross pole signals or to provide protection using the cross polarization signals.

In some embodiments, an ODU architecture may comprise one transmitter and two receivers. In various embodiments, indoor modems (e.g., which may be part of an indoor unit or IDU) implement maximal ratio combining (MRC) utilizing signals received via the cable from one or more ODU(s) (e.g., diversity signals may not be combined in the ODU.). Those skilled in the art will appreciate that one or more modems may utilize any technique to combine two or more signals.

Figure 9:
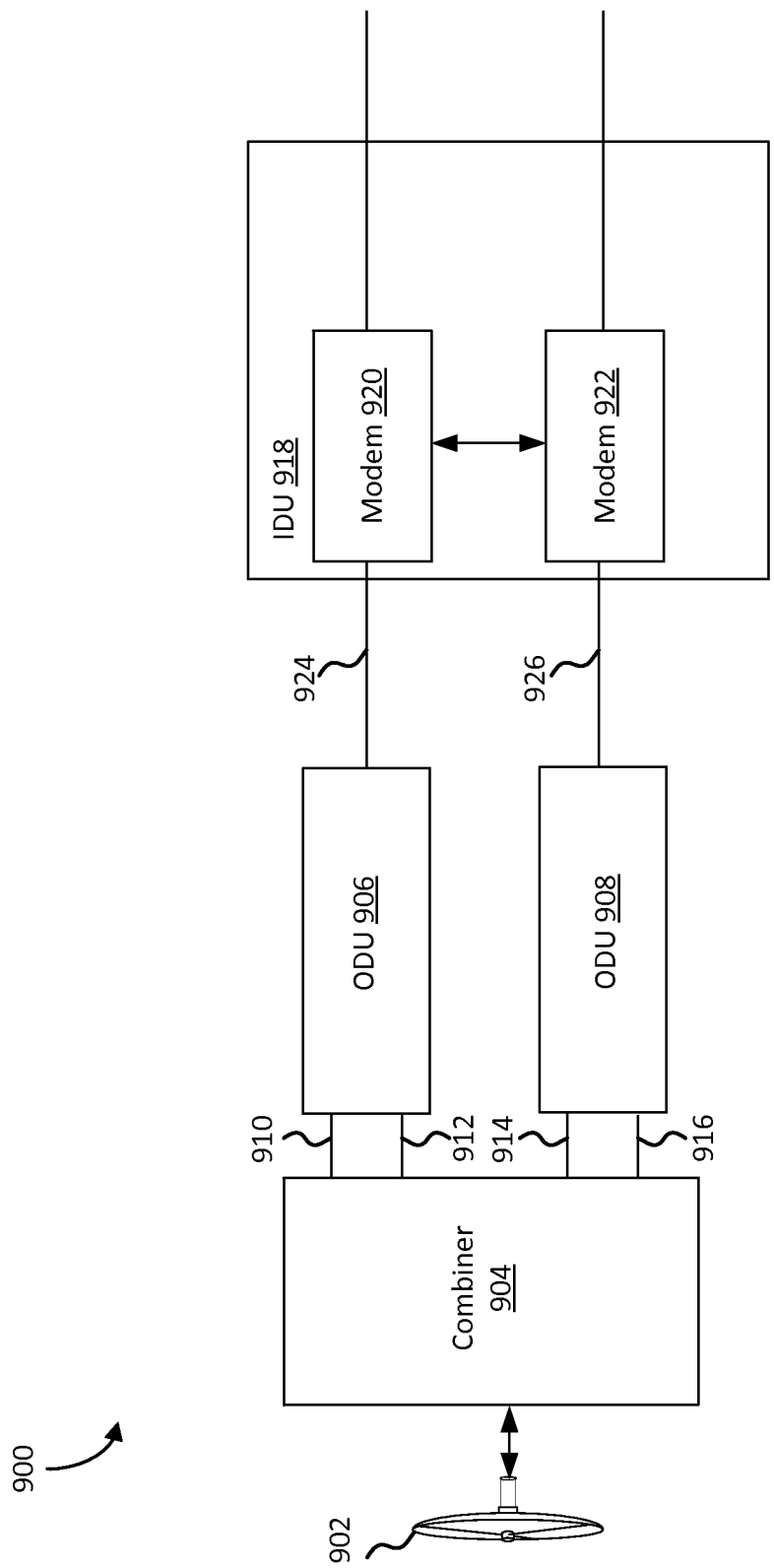
FIG. 9 is a block diagram of two ODUs each configured to receive two diversely polarized signals from an antenna and provide multiple signals for each diversely polarized signal over a cable in carrier groups over separate cables to separate modems in some embodiments.

FIG. 9 is a block diagram of two ODUs 906 and 908 each configured to receive two diversely polarized signals from an antenna 902 and provide multiple signals for each diversely polarized signal over a cable in carrier groups over separate cables 924 and 926 to separate modems 920 and 922 in some embodiments. In one example, the system 900 is part of a microwave radio system with improved high capacity implementation. This two ODU arrangement (e.g., ODU 906 and 908) may utilize two cables (e.g., coaxial or IF cables) to connect to one or two modems (e.g., 920 and 922).

In various embodiments, antenna 902 is coupled to combiner 904. The antenna 902 may be any kind of antenna including, for example, an antenna used in a microwave communication system. The antenna 902 may, in some embodiments, send and receive signals that are diversely polarized (e.g., horizontally polarized signals and vertically polarized signals).

There may be multiple paths or wires coupling the antenna 902 to the combiner 904. In one example, the antenna 902 may provide a horizontally polarized signal to the combiner 904 over one path and a vertically polarized signal to the combiner 904 over another path.

The combiner 904 may provide the diversely polarized signals to ODUs 906 and 908. In one example, the combiner 904 comprises an orthomode transducer. In some embodiments, the combiner 904 provides diversely polarized signals over separate paths. For example, the combiner 904 may provide a vertically polarized signal to the ODU 906 via path 910 and may provide a horizontally polarized signal to the ODU 906 via path 912. Similarly, the combiner 904 may provide the vertically polarized signal (e.g., the same vertically polarized signal as that provided to the ODU 906) to the ODU 908 via signal path 916 and the horizontally polarized signal (e.g., the same horizontally polarized signal as that provided to the ODU 906) to the ODU 908 via signal path 914. The signals may be provided in any order and over any number of paths to either or both ODUs.

In various embodiments, the ODU 906 and ODU 908 are coupled to the combiner 904 via one or more waveguides. In one example, signal paths 910, 912, 914, and 916 each comprise at least one waveguide.

The ODU 906 and/or ODU 908 may be similar to other ODUs described herein. In one example, the ODU 906 and/or ODU 908 may comprise one or more components as shown in and discussed relative to FIGS. 3, 4, and 5 (e.g., ODU 300, ODU 400, and ODU 510). The ODU 906 and ODU 908 may each comprise two receivers and one transmitter. In some embodiments, the ODU 906 and/or 908 comprises a converter to downconvert signals (e.g., first and/or second received diversity signals) received via the antenna 902 to an intermediate frequency and/or a carrier frequency. In various embodiments, the converter is a receiver. Further, the ODU 906 and/or 908 comprises a converter to upconvert signals (e.g., transmit signals) received from a modem (e.g., modem 920 and/or 922) to a microwave frequency (e.g., an RF frequency) from an intermediate frequency or a carrier group for transmission. In various embodiments, the converter is a receiver. Similarly, ODUs identified in FIGS. 10 and 11 may also comprise one or more components of other ODUs as shown in and discussed relative to FIGS. 3, 4, and 5.

The ODU 906 may convert a first polarized signal from the combiner 904 to a first main received signal and a second polarized signal from the combiner 904 to a first diversity received signal. A receiver or other component in the ODU 906 may also generate groups of signals for each polarized signal to provide the groups of signals over the cable 924 in channels (e.g., four channels). In one example, a receiver in the ODU 906 generates a group of signals from the first main received signal to provide over the cable 924 in channels. Similarly, another receiver (e.g., a spare receiver) or other component in the ODU 906 may generate groups of signals (e.g., four signals) from the first diversity received signal and provide the groups of signals to cable 924 in channels. Any number of signals in any number of channels may be provided over the cable 924 and/or cable 926.

The ODU 908 may also convert a third polarized signal from the combiner 904 to a second main received signal and a fourth polarized signal from the combiner 904 to a second diversity received signal. In various embodiments, the third polarized signal converted to the second main received signal by the ODU 908 is at a different polarization than the first polarized signal that was converted to the first main received signal by the ODU 906. For example, the vertically polarized signal from the antenna 902 may be converted to a first main received signal by the ODU 906 while the horizontally polarized signal from the antenna 902 may be converted to a second main received signal by the ODU 908.

A receiver or other component in the ODU 906 may convert signals from the antenna 902 into multiple signals and provide the signals over the cable 924 in channels. For example, the cable 924 may carry four signals in each 28 MHz carrier group to provide the main received signal and the cable 924 may carry four signals in each 28 MHz carrier group to provide the diversity received signal to the IDU 918. The cable 924 may further carry four signals in each 28 MHz carrier group to provide a transmit signal from the IDU 918 to the ODU 906. Those skilled in the art will appreciate that all three carrier groups may be present on the cable 924 simultaneously.

Similarly, a receiver or other component in the ODU 908 may also convert signals from the antenna 902 into multiple signals and provide the signals over the cable 926 in channels. For example, the cable 926 may carry four signals in each 28 MHz carrier group to provide the main received signal and the cable 926 may carry four signals in each 28 MHz carrier group to provide the diversity received signal to the IDU 918. The cable 926 may further carry four signals in each 28 MHz carrier group to provide a transmit signal from the IDU 918 to the ODU 908. Those skilled in the art will appreciate that all three carrier groups may be present on the cable 926 simultaneously.

In various embodiments, the modem 920 and modem 922 may receive signals from customer premises equipment (or from any other device(s)) to transmit over the antenna 902. In one example, the modem 920 may receive a first transmit signal to be transmitted as a vertically polarized signal from the antenna 902 and the modem 922 may receive a second transmit signal to be transmitted as a horizontally polarized signal from the antenna 902. The modem 920 or other component may generate any number of signals in one or more different carrier groups to provide the first transmit signal over the cable 924. Similarly, the modem 922 or other component may generate any number of signals in one or more different carrier groups to provide the second transmit signal over the cable 926.

The ODU 906 may receive the signals from the IDU 918 via the cable 924 and provide the signals to a transmitter to prepare the first transmit signal for transmission (e.g., upconvert the first transmit signal and/or convert the first transmit signal to a vertically polarized signal for the antenna 902). The ODU 908 may receive the signals from the IDU 918 via the cable 926 and provide the signals to a second transmitter to prepare the second transmit signal for transmission (e.g., upconvert the second transmit signal and/or convert the second transmit signal to a horizontally polarized signal for the antenna 902)

Those skilled in the art will appreciate that the signals in each group of carriers (e.g., for the main received signal, the diversity received signal, and the transmit signal) may propagate over the cable 924 at the same time and without interference. In various embodiments, a first N-plexer of the IDU 918 and an N-plexer of the ODU 906 provide signals in carriers to or receive signals in carriers from the cable 924. Further, the signals in each group of carriers (e.g., for the main received signal, the diversity received signal, and the transmit signal) may propagate over the cable 926 at the same time and without interference. In various embodiments, a second N-plexer of the IDU 918 and an N-plexer of the ODU 908 provide signals in carriers to or receive signals in carriers from the cable 926. In various embodiments, providing signals in carriers over the cable (e.g., cable 924 or cable 926) allows noise encountered in transmitting the multi-carrier signals through one amplifier to be overcome.

In various embodiments, each group may comprise four 28 MHz carriers (e.g., four carriers for the main received signal, four carriers for the diversity received signal, and four carriers for the transmit signal for a total of twelve signals). Any number of carriers at any frequency may be utilized for any number of signals.

Those skilled in the art will appreciate that by generating signals in groups of carriers (e.g., four groups of 28 MHz carriers) to provide the received and transmit signals, cables may be used rather than expensive waveguides. In various embodiments, the system allows mounting of radios outdoors thereby avoiding RF signal loss in waveguide interconnection.

The modems 920 and 922 may be coupled to each other. In various embodiments, the diversity signal (e.g., the horizontally polarized signal from the antenna 902 for the modem 920 and the vertically polarized signal from the antenna 902 for the modem 922) may improve signal to noise ratio (e.g., by 3 dB) using maximum ratio combining (MRC). In various embodiments, the signal to noise ratio may be further improved (e.g., by another 3 dB) by using the cross pole signal which may be available to be shared between modems.

Although two modems are depicted in FIG. 9 (e.g., modem 920 and 922), a single modem may receive signals and/or carrier groups from both the ODU 906 and 908.

Figure 10:
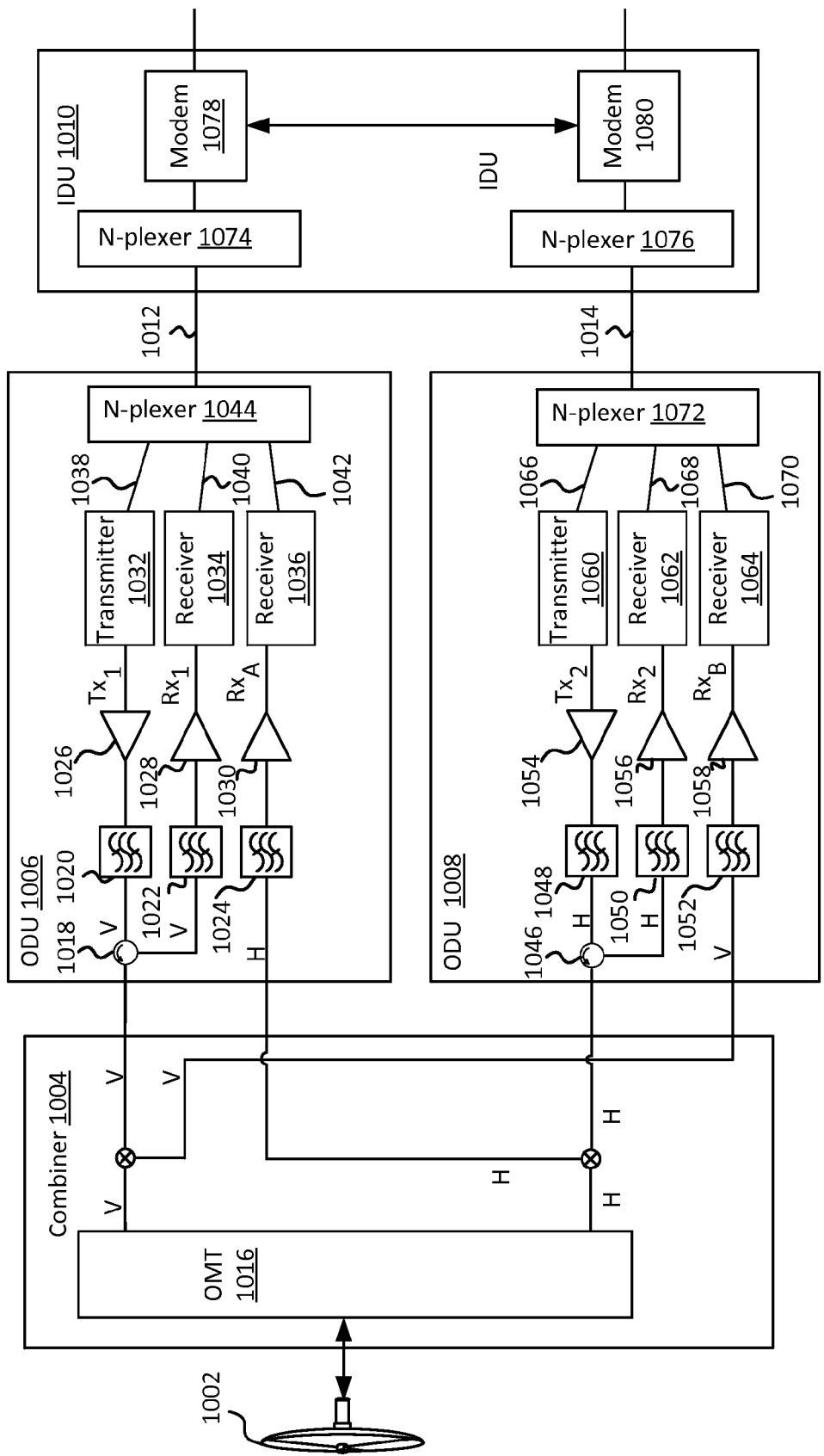
FIG. 10 depicts a high capacity wireless communication system to transmit and receive polarized signals over a single antenna utilizing receivers/transmitters in communication with modems over separate cables in some embodiments.

FIG. 10 depicts a high capacity wireless communication system to transmit and receive polarized signals over a single antenna utilizing receivers/transmitters in communication with modems over separate cables in some embodiments. FIG. 10 depicts an antenna 1002 coupled to a combiner 1004. The combiner 1004 is coupled to ODU 1006 and 1008. Each ODU 1006 and 1008 is coupled to the IDU 1010 via cables 1012 and 1014, respectively. In some embodiments, FIG. 10 depicts the components of FIG. 9 in greater detail.

The antenna 1002 may be any antenna used for communication. For example, the antenna 1002 may be a parabolic antenna or any type of antenna. The antenna 1002 may be part of a microwave communication system. In some embodiments, the antenna 1002 is configured to receive polarized communication signals. There may be any number of antennas including, for example, different antennas for receiving polarized signals. For the purposes of this discussion, polarized signals are referred to as including horizontally polarized and vertically polarized. Those skilled in the art will appreciate that any polarized signals may be utilized.

The antenna 1002 may be coupled with the combiner 1004 and/or OMT 1016 via a circular waveguide. In some embodiments, the circular waveguide is part of a resizable collar that may be mounted to or on the antenna 1002. The waveguide may be any waveguide kind or type of waveguide. For example, the waveguide may be hollow or dielectric. In some embodiments, the waveguide comprises a waveguide of any shape.

The combiner 1004 may utilize circulators instead of splitters. In various embodiments, utilizing a circulator in the combiner may extend to carrying four groups on two cross polar antennas. In various embodiments, there are no cables between the two ODUs 1006 and 1008, and/or no power splitting.

The combiner 1004 may comprise six ports. Two of the six ports (e.g., the fifth and sixth port) may receive a horizontally polarized signal from the antenna 1002 and a vertically polarized signal from the antenna 1002, respectively. The other four ports may provide a horizontally polarized signal and a vertically polarized signal to the ODU 1006 as well as ODU 1008. In one example, the combiner 1004 provides the vertically polarized signal to the ODU 1006 over the first port, provides the horizontally polarized signal to the ODU 1006 over the second port, provides the horizontally polarized signal to the ODU 1008 over the third port, and provides the vertically polarized signal to the ODU 1006 over the fourth port.

The combiner 1004 may comprise an orthomode transducer (OMT) 1016. The OMT 1016 is configured to route polarized signals to different signal paths (e.g., which lead through or to different ports) based on polarization. In some embodiments, the OMT 1016 is configured to polarize and depolarize signals. The OMT 1016 may comprise an orthomode transducer and/or waveguide filters.

In various embodiments, the combiner 1004 may split a vertically polarized signal from the OMT 1016 into first and second vertically polarized signals. The combiner 1004 may provide the first vertically polarized signal to the ODU 1006 and may provide the second vertically polarized signal to the ODU 1008. Similarly, the combiner 1004 may split a horizontally polarized signal from the OMT 1016 into first and second horizontally polarized signals. The combiner 1004 may provide the first horizontally polarized signal to the ODU 1006 and may provide the second horizontally polarized signal to the ODU 1008.

The ODU 1006 may convert the vertically polarized signal and the horizontally polarized signal to a first diversity received signal (e.g., a main received signal) and a second diversity received signal (e.g., a diversity received signal). The ODU 1006 may provide the first and second diversity received signals over the cable 1012 in multiple carriers to the IDU 1010. In one example, each diversity received signal may be provided over the cable 1012 in four 28 MHz carriers (e.g., the ODU 1008 may provide both diversity received signals in eight 28 MHz carriers). Those skilled in the art will appreciate that the ODU 1006 may provide the diversity received signals over the cable 1012 utilizing any number of signals in any number of carriers at any frequency.

Similarly, the ODU 1008 may convert the horizontally polarized signal and the vertically polarized signal to a third diversity received signal (e.g., a main received signal) and a fourth diversity received signal (e.g., a diversity received signal). The ODU 1006 may provide the third and fourth diversity received signals within multiple carriers over the cable 1014 to the IDU 1010. In one example, each diversity received signal may be provided over the cable 1014 in four 28 MHz carriers (e.g., the IDU 1008 may provide both diversity received signals in eight 28 MHz carriers). Those skilled in the art will appreciate that the ODU 1006 may provide the diversity received signals over the cable 1012 utilizing any number of signals in any number of carriers at any frequency.

Those skilled in the art will appreciate that each carrier within the group of carriers may be used for capacity increase or can be used for protection (e.g., redundancy). In some embodiments, 2 GB of capability may be achieved. In one example, only one coaxial cable is used between one ODU (e.g., ODU 1006 or ODU 1008) and the IDU 1010.

ODU 1006 comprises a waveguide circulator 1018 coupled to waveguide filters 1020 and 1022. In various embodiments, the combiner 1004 provides the vertically polarized signal from the antenna 1002 to the circulator 1018. The circulator 1018 may provide the vertically polarized signal to the waveguide filter 1022. The combiner 1004 may also provide the horizontally polarized signal from the antenna 1002 to waveguide filter 1024. The vertically polarized signal may be a main received signal of the ODU 1006 and the horizontally polarized signal may be a diversity received signal (e.g., diverse to the main received signal).

Waveguide filters 1020, 1022, and 1024 may each be configured to filter and direct signals. The waveguide filters 1022 and 1024 may prevent receive signals from propagating back towards the antenna 1002. Similarly, the waveguide filter 1020 may prevent transmit signals from propagating back towards a transmitter or components of a transmitter (e.g., RF-IF converter or transmitter 1032).

Each waveguide filter 1020 and/or 1022 may comprise a transmit filter and a receive filter. The transmit filter may be configured to receive signals from a transmitter (e.g., transmitter 1032) and provide the signal to the antenna 1002 via a stacked waveguide circulator (e.g., circulator 1018). In one example, if a received signal (e.g., a signal provided from the antenna 1002) is directed to the waveguide filter 1020 (e.g., a transmit waveguide filter), the waveguide filter 1020 may block the signal. Subsequently the signal may be returned or reflected back to a stacked waveguide circular (e.g., circulator 1018) which may redirect the signal to the next port (e.g., the waveguide filter 1022). The waveguide filter 1020 is a filter that may reduce or eliminate undesired aspects (e.g., noise) of a signal to be transmitted from a transmitter 1032 to the antenna 1002.

The waveguide filter 1022 may be configured to receive signals from the antenna 1002 (via the stacked waveguide circulator component 1018) and provide the signal to a receiver (which may comprise the RF-IF converter or a receiver 1034 via a power amplifier 1028). In one example, if a received signal is provided back towards the antenna 1002, the waveguide filter 1022 may block the signal. Subsequently, the signal may be returned or reflected to the RF-IF converter or receiver 1034. The waveguide filter 1022, like the waveguide filter 1020, may reduce or eliminate undesired aspects (e.g., noise) of a received signal from the antenna 1002. The waveguide filter 1022 may be stacked and/or coupled with waveguide filter 1020.

Similarly, the waveguide filter 1024 may be configured to receive other signals (e.g., signals that are diverse from those received by the waveguide filter 1022) from the antenna 1002 and provide the signal to a receiver (which may comprise the RF-IF converter or a receiver 1036 via a power amplifier 1030). In one example, if a receive signal is provided back towards the antenna 1002, the waveguide filter 1024 may block the signal. Subsequently, the signal may be returned or reflected to the RF-IF converter or receiver 1036. The waveguide filter 1024, like the waveguide filter 1022, may reduce or eliminate undesired aspects (e.g., noise) of a received signal from the antenna 1002. The waveguide filter 1024 may be stacked and/or coupled with the waveguide filters 1020 and/or 1022.

In some embodiments, an SMA isolator is a SubMiniature version A (SMA) coaxial RF connector coupled between a waveguide filter and a transmitter or receiver (e.g., between waveguide filter 1020 and transmitter 1032, between waveguide filter 1022 and receiver 1034, or between waveguide filter 1024 and receiver 1036). In one example, the SMA isolator may transmit microwave or radio frequency power in one direction. The SMA isolator may shield equipment. The SMA isolator may be coupled to the transmit filter and a transmitter. In another example, the SMA isolator is coupled to the receiver filter and a receiver.

In some embodiments, the SMA isolator prevents signals from being provided through the transmit filter back to the transmitter. If a signal is provided through the transmit filter to the transmitter, the SMA isolator may block the signal. Subsequently the signal may be returned or reflected back to the stacked waveguide circular 1018 which may redirect the signal to the receive filter.

The transmitter 1032 may be configured to provide a transmission signal (e.g., a signal to be transmitted by the antenna 1002 in one polarization) through the power amplifier 1026 to the waveguide filter 1020. Similarly, the waveguide filters 1022 and 1024 may provide signals to the receiver 1034 and 1036 via power amplifiers 1028 and 1030, respectively.

The receivers 1034 and 1036 are any components configured to process and/or convert received signals. In various embodiments, the receivers 1034 and 1036 downconvert signals from the waveguide filters 1022 and 1024 to different intermediate frequencies. The receivers 1034 and 1036 may also provide the signals, respectively, to the N-plexer 1044 in carrier groups (e.g., each signal is provided to the N-plexer 1044 in four 28 MHz groups). In one example, the receiver 1034 provides the formerly vertically polarized receive signal from the waveguide filter 1022 to the N-plexer 1044 via signal path 1040 as four 28 MHz groups. The receiver 1036 may provide the formerly horizontally polarized receive signal from the waveguide filter 1024 to the N-plexer 1044 via signal path 1042 as four other 28 MHz groups.

The N-plexer 1044 is a multi-band device that may be configured to direct or route multiple signals at different frequencies. For example, the N-plexer 1044 may receive a first carrier group from receiver 1034 via signal path 1040 and a second carrier group from receiver 1036 via signal path 1042. The N-plexer 1044 may direct both carrier groups over the cable 1012.

The N-plexer 1044 may also receive multiple transmit signals at different frequencies and route the transmit signals. For example, the N-plexer 1044 may receive a third carrier group containing one or more signals to be transmitted and the N-plexer 1044 may route a fourth carrier group to the transmitter 1032 via signal path 1038. The N-plexer 1044 may route a plurality of signals based on frequencies of the signals and/or carrier groups.

In various embodiments, one or more signal generator and separator for signals are coupled to the cable 1012 and cable 1014 to separate the carrier groups, separate the diversity received signals and the transmit signal in the modems and ODUs, and/or provide filtering of the multi-carrier group to reduce noise in those slots without a carrier.

In various embodiments, each carrier within a group is capable of operating at 1024 QAM. In some embodiments, a throughput of approximately 250 MB in a 28 MHz channel is achieved. Each group may be capable of 1 GB using four ODUs on two antennas.

Although signal paths 1038, 1040, and 1042 are each depicted as a signal path, those skilled in the art will appreciate that the signal paths 1038, 1040, and 1042 may be multiple paths (e.g., the signal path 1038 may comprise two separate signal paths electrically coupled to different converters).

Although an N-plexer 1044 is depicted in FIG. 10, those skilled in the art will appreciate that any device, circuit(s), and/or component(s) may be configured to maintain and/or propagate multiple signals across cable 1012 without interfering the signals or the signals interfering with each other.

The coaxial cable 1012 couples the ODU 1006 and an N-plexer 1074, a modem 1078, and/or the IDU 1010. The coaxial cable 1012 is not limited to coax but may be any cable or combination of cables.

ODU 1008 may be similar to the ODU 1006, however, the ODU 1008 may receive the horizontally polarized signal as a main received signal and a vertically polarized signal as a diversity received signal. The ODU 1008 may provide the received signals as groups of signals in carrier groups over cable 1014 to the IDU 1010.

The ODU 1008 comprises a waveguide circulator 1046 coupled to waveguide filters 1048 and 1050. In various embodiments, the combiner 1004 provides the horizontally polarized signal from the antenna 1002 to the circulator 1046. The circulator 1046 may provide the horizontally polarized signal to the waveguide filter 1050. The combiner 1004 may also provide the vertically polarized signal from the antenna 1002 to waveguide filter 1052.

Waveguide filters 1048, 1050, and 1052 may each be configured to filter and direct signals. The waveguide filters 1050 and 1052 may prevent receive signals from propagating back towards the antenna 1002. Similarly, the waveguide filter 1048 may prevent transmit signals from propagating back towards a transmitter or components of a transmitter (e.g., RF-IF converter or transmitter 1060).

Each waveguide filter 1048 and/or 1050 may comprise a transmit filter and a receive filter. The transmit filter may be configured to receive signals from a transmitter (e.g., transmitter 1060) and provide the signal to the antenna 1002 via a stacked waveguide circulator (e.g., circulator 1046). In one example, if a received signal (e.g., a signal is provided from the antenna 1002) is directed to the waveguide filter 1048 (e.g., a transmit waveguide filter), the waveguide filter 1048 may block the signal. Subsequently, the signal may be returned or reflected back to a stacked waveguide circular (e.g., circulator 1046) which may redirect the signal to the next port (e.g., the waveguide filter 1050). The waveguide filter 1048 is a filter that may reduce or eliminate undesired aspects (e.g., noise) of a signal to be transmitted from a transmitter to the antenna 1002.

The waveguide filter 1050 may be configured to receive signals from the antenna 1002 (via the stacked waveguide circulator component 1046) and provide the signal to a receiver (which may comprise the RF-IF converter or a receiver 1062 via a power amplifier 1056). In one example, if a received signal is provided back towards the antenna 1002, the waveguide filter 1050 may block the signal. Subsequently, the signal may be returned or reflected to the RF-IF converter or receiver 1062. The waveguide filter 1050, like the waveguide filter 1048, may reduce or eliminate undesired aspects (e.g., noise) of a received signal from the antenna 1002. The waveguide filter 1050 may be stacked and/or coupled with waveguide filter 1048.

Similarly, the waveguide filter 1052 may be configured to receive other signals (e.g., signals that are diverse from those received by the waveguide filter 1050) from the antenna 1002 and provide the signal to a receiver (which may comprise the RF-IF converter or a receiver 1064 via a power amplifier 1058). In one example, if a received signal is provided back towards the antenna 1002, the waveguide filter 1052 may block the signal. Subsequently, the signal may be returned or reflected to the RF-IF converter or receiver 1064. The waveguide filter 1052, like the waveguide filters 1054 and 1056, may reduce or eliminate undesired aspects (e.g., noise) of a received signal from the antenna 1002. The waveguide filter 1052 may be stacked and/or coupled with the waveguide filters 1048 and/or 1050.

In some embodiments, an SMA isolator may be coupled between a waveguide filter and a transmitter or receiver (e.g., between waveguide filter 1048 and transmitter 1060, between waveguide filter 1050 and receiver 1062, or between waveguide filter 1052 and receiver 1064). The SMA isolator may shield equipment. The SMA isolator may be coupled to the transmit filter and a transmitter. In another example, the SMA isolator is coupled to the receiver filter and a receiver.

The transmitter 1060 may be configured to provide a transmission signal (e.g., a signal to be transmitted by the antenna 1002 in one polarization) through the power amplifier 1054 to the waveguide filter 1048. Similarly, the waveguide filters 1050 and 1052 may provide signals to the receiver 1062 and 1064 via power amplifiers 1056 and 1058, respectively.

The receivers 1062 and 1064 are any components configured to process and/or convert received signals. In various embodiments, the receivers 1062 and 1064 may downconvert signals from the waveguide filters 1050 and 1052 to different intermediate frequencies. The receivers 1062 and 1064 may also provide the signals, respectively, to the N-plexer 1072 in carrier groups (e.g., each signal is provided to the N-plexer 1072 in four 28 MHz groups). In one example, the receiver 1062 provides the formerly horizontally polarized receive signal from the waveguide filter 1050 to the N-plexer 1072 via signal path 1068 as four 28 MHz carriers. The receiver 1064 may provide the formerly vertically polarized receive signal from the waveguide filter 1052 to the N-plexer 1072 via signal path 1070 as four other 28 MHz carriers.

The N-plexer 1072 is a multi-band device that may be configured to direct or route multiple signals at different frequencies. For example, the N-plexer 1072 may receive a first carrier group representing a main received signal from receiver 1062 via signal 1068 path and a second carrier group representing a diversity received signal from the receiver 1064 via signal path 1070. The N-plexer 1072 may direct both groups over the cable 1014.

The N-plexer 1072 may also receive multiple transmit signal as a third carrier group and route third carrier group. For example, the N-plexer 1072 may receive the third carrier group containing one or more signals to be transmitted and the N-plexer 1072 may route the third carrier group to the transmitter 1060 via signal path 1066. The transmitter 1060 may downconvert or otherwise prepare the signal to be transmitted. The N-plexer 1076 may route a plurality of signals based on frequencies of the signals.

Although signal paths 1066, 1068, and 1070 are each depicted as a signal path, those skilled in the art will appreciate that the signal paths 1066, 1068, and 1070 may be multiple paths (e.g., the signal path 1066 may comprise two separate signal paths electrically coupled to different converters).

Although an N-plexer 1072 is depicted in FIG. 10, those skilled in the art will appreciate that any device, circuit(s), and/or component(s) may be configured to maintain and/or propagate multiple signals across cable 1014 without interfering the signals or the signals interfering with each other.

The coaxial cable 1014 couples the ODU 1008 with an N-plexer 1076, modem 1080, and/or the IDU 1010. The coaxial cable 1014 is not limited to coax but may be any cable or combination of cables.

The IDU 1010 may be any unit configured to communicate with the ODU 1006 and 1008 over cables 1012 and 1014, respectively. Although FIG. 10 identifies an IDU 1010, those skilled in the art will appreciate that systems and methods described herein may, in some embodiments, be utilized with an N-plexer and modems that communicates with one or more separate units over the cable 1012 and/or 1014.

The IDU 1010 may comprise an N-plexer 1074 electrically coupled with the cable 1012 and a modem 1078. The modem 1078 may further be coupled with an IF-BB converter which may be in communication with customer premises equipment. The IDU 1010 may also comprise an N-plexer 1076 electrically coupled with the cable 1014 and a modem 1080. The modem 1080 may further be coupled with an IF-BB converter which may be in communication with customer premises equipment. The modems 1078 and 1080 may, in some embodiments, communicate with each other to take advantage of polarization and/or spatial diversity.

Those skilled in the art will appreciate that the IDU 1010 may comprise any number of components, including, for example, a power module and a telemetry module. The power module may be configured to provide power to the ODU 1006, ODU 1008, or both via the cable 1012, cable 1014, or both. One or more telemetry modules may be configured to detect and correct for errors in received signals and provide corrective information to the ODU 1010 or ODU 1008 via the cable 1012, cable 1014, or both. Further, the IDU 1010 may comprise gain adjusters, filters, and/or phase adjusters, or the like.

In some embodiments, the components of the IDU 1010 may be in any order. In some embodiments, an IF-BB converter may be coupled to the N-plexer 1074 and the modem 1078. For example, the IF-BB converter may be configured to downconvert a carrier group and/or diversity received signals received from the N-plexer 1074 before providing the downconverted diversity received signals to the modem 1078. Similarly, the IF-BB converter may upconvert diversity transmit signals to different frequencies and/or generate carrier groups. The IF-BB converter may receive the diversity transmit signals from the modem 1078 and provide the upconverted signals to the N-plexer 1074.

Similarly, in various embodiments, an IF-BB converter may be coupled to the N-plexer 1076 and the modem 1080. For example, the IF-BB converter may be configured to downconvert a carrier group and/or diversity received signals received from the N-plexer 1076 before providing the downconverted diversity received signals to the modem 1080. Similarly, the IF-BB converter may upconvert diversity transmit signals to different frequencies and/or generate carrier groups. The IF-BB converter may receive the diversity transmit signals from the modem 1080 and provide the upconverted signals to the N-plexer 1076.

In various embodiments, the N-plexer 1074 may direct diversity received signals and/or carrier groups from the cable 1012 to one or more different signal paths based on the frequency of the signals and/or carrier groups. The N-plexer 1074 may also receive transmit signals from the modem 1078. The diversity transmit signals may be grouped in carriers (e.g., four carriers of 24 MHz) utilizing different frequencies from the groups of carriers provided for the diversity received signals. Those skilled in the art will appreciate that there may be any number of signals and corresponding signal paths between the modem 1080 and the N-plexer 1076.

In various embodiments, the N-plexer 1076 may direct diversity received signals from the cable 1014 to one or more different signal paths based on the frequency of the carriers or carrier groups. The N-plexer 1076 may also receive transmit signals from the modem 1080. The diversity transmit signals may be grouped in carrier groups (e.g., four carriers of 24 MHz) utilizing different frequencies of the carrier groups for the diversity received signals. Those skilled in the art will appreciate that there may be any number of signals and corresponding signal paths between the modem 1080 and the N-plexer 1076.

The modems 1078 and 1080 may be any modems configured to demodulate diversity received signals and modulate diversity transmit signals (e.g., upconverted signals to be transmitted received from the customer equipment). In various embodiments, the modems 1078 and 1080 converts modulated diversity transmit signals to groups of different or similar frequency. In various embodiments, receiver 1034, receiver 1036, receiver 1062, receiver 1064, modem 1078, modem 1080, or any combination thereof may perform layer 1 link aggregation to provide for intelligent QoS to be implemented which may put high priority traffic on more than one carrier in a multi-carrier group and on more than one group. This process is further described in U.S. Nonprovisional patent application Ser. No. 11/351,983, filed Feb. 10, 2006 and entitled "System and Method for Resilient Wireless Packet Communication," which is incorporated by reference herein.

The one or more optional IF-BB converters may include converter configured to upconvert signals to be transmitted received from customer equipment (e.g., from a baseband to an IF frequency) and downconvert signals received from the modem 1078 and/or 1080 (e.g., demodulated receive signals from IF frequency to a baseband frequency). Although the IF-BB converter is identified as "IF-BB," the IF-BB converter may upconvert signals to be transmitted to any frequency (not just IF) and the IF-BB converter may downconvert signals to any frequency (not just baseband). The IF-BB converter may be optional.

In various embodiments, there may any number of signal paths between the modem 1078 and/or 1080 and one or more IF-BB converters. For example, an IF-BB converter may provide upconverted transmit signals or carrier groups to the modem 1078 and/or modem 1080 over any number of different signal paths. The modem 1078 may provide demodulated receive signals to the IF-BB converter over one or two other signal paths.

In various embodiments, the IDU 1010 or second unit may include a power module configured to provide power to the ODU 1006 and/or 1008. For example, the power module may provide a power signal to the N-plexer 1074. The N-plexer 1074 may provide the power signal to the cable 1012. Since the power signal may be DC power, the frequency of the power signal is different (e.g., 0 Hz) from that of other signals that may be propagating on the cable 1012. As a result, the N-plexer 1044 may receive the power signal from the cable 1012 and provide the power signal to the correct path to power the ODU 1006.

Similarly, the power module may provide a power signal to the N-plexer 1076. The N-plexer 1076 may provide the power signal to the cable 1014. Since the power signal may be DC power, the frequency of the power signal is different (e.g., 0 Hz) from that of other signals that may be propagating on the cable 1014. As a result, the N-plexer 1046 may receive the power signal from the cable 1014 and provide the power signal to the correct path to power the ODU 1008.

Further, the IDU 1010 unit may include a telemetry module configured to provide a telemetry signal to the ODU 1006 and/or 1008 to allow for communication between one or both ODUs and the IDU 1010. The telemetry signal may be at a frequency that is different than other signals propagating across the single cable 1012 and/or 1014. For example, the telemetry module may provide a telemetry signal to the N-plexer 1074. The N-plexer 1074 may provide the telemetry signal to the cable 1012. Since the frequency of the telemetry signal is different (e.g., 5 MHz) from that of other signals that may be propagating on the cable 1012, the N-plexer 1044 may receive the telemetry signal from the cable and provide the telemetry signal to the correct path to allow for communication.

In various embodiments, the IDU 1010 may comprise a signal quality module, controller module, signal processing module, and/or a data interface module as discussed in FIG. 2. In various embodiments, the signal quality module and/or the signal processing module may apply a receive signal from a diversity antenna (in an antenna spatial diversity system) when errors are detected. In some embodiments, the receive signal from the diversity antenna may be disregarded (e.g., when the quality of the receive signal from the main antenna is high or above a threshold).

In various embodiments, a higher capacity may be achieved by utilizing two spatially diverse antennas and four ODUs each coupled over a separate cable to different modems. In one example, 4 GB capability may be achieved without the need to have long waveguide connections. In one example, the components of FIG. 10 are doubled thereby allowing each carrier group to be used for capacity increase or can be configured for protection. This may allow for implementation of a radio (e.g., a 4 GB radio) without power splitters or inter-antenna cables.

Figure 11:
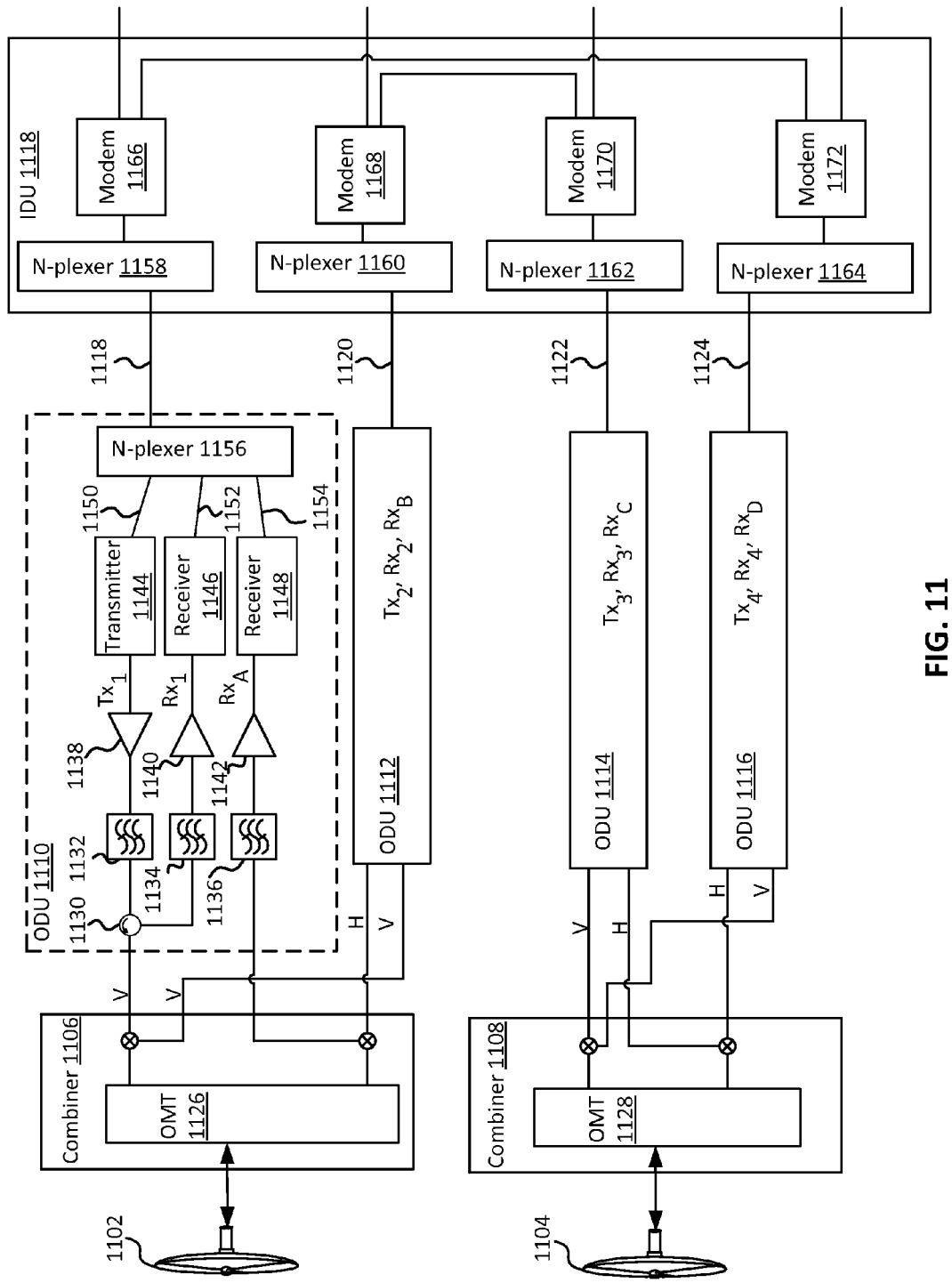
FIG. 11 depicts a high capacity wireless communication system with multiple antennas to transmit and receive polarized signals utilizing receivers/transmitters in communication with modems over separate cables in some embodiments.

FIG. 11 depicts a high capacity wireless communication system with multiple antennas 1102 and 1104 to transmit and receive polarized signals utilizing receivers/transmitters in communication with modems 1166, 1168, 1170, and 1172 over separate cables 1118, 1120, 1122, and 1124 in some embodiments. FIG. 11 depicts a high capacity wireless communication system with multiple antennas 1102 and 1104 to transmit and receive orthogonally polarized signals between receivers/transmitters and modems in a high capacity system in some embodiments.

The antennas 1102 and 1104 may be any antennas used for communication. For example, the antennas 1102 and 1104 may be a parabolic antenna or any type of antenna. The antenna 1102 and 1104 may be part of a microwave communication system. In some embodiments, the antennas 1102 and 1104 are configured to receive polarized communication signals. The antennas 1102 and 1104 may be spatially diverse from each other.

The antenna 1102 may be coupled with the combiner 1106 and/or OMT 1126 via a circular waveguide. In some embodiments, the circular waveguide is part of a resizable collar that may be mounted to or on the antenna 1102. As discussed with regard to FIG. 10, the combiner 1106 may comprise six ports. Two of the six ports may receive a horizontally polarized signal from the antenna 1102 and a vertically polarized signal from the antenna 1102, respectively. The combiner 1106 may provide a vertically polarized signal over a first port to the ODU 1110, a horizontally polarized signal over the second port to the ODU 1110, a horizontally polarized signal over the third port to the ODU 1112, and a vertically polarized signal over the fourth port to the ODU 1116.

Similarly, the antenna 1104 may be coupled with the combiner 1108 and/or OMT 1128 via a circular waveguide. The combiner 1106 may comprise any number of ports. For example, two of the six ports may receive a horizontally polarized signal from the antenna 1104 and a vertically polarized signal from the antenna 1104, respectively. The combiner 1108 may provide a vertically polarized signal over a first port to the ODU 1114, a horizontally polarized signal over the second port to the ODU 1114, a horizontally polarized signal over the third port to the ODU 1116, and a vertically polarized signal over the fourth port to the ODU 1116.

The combiners 1006 and 1108 may comprise orthomode transducers (OMTs) 1126 and 1128. The OMTs 1126 and 1128 are configured to route polarized signals to different signal paths based on polarization. In various embodiments, the combiner 1106 may split a vertically polarized signal from the OMT 1126 into first and second vertically polarized signals (e.g., utilizing splitters, waveguides, and/or circulators). The combiner 1106 may provide the first vertically polarized signal to the ODU 1110 and may provide the second vertically polarized signal to the ODU 1112. Similarly, the combiner 1106 may split a horizontally polarized signal from the OMT 1126 into first and second horizontally polarized signals. The combiner 1106 may provide the first horizontally polarized signal to the ODU 1110 and may provide the second horizontally polarized signal to the ODU 1112.

Similarly, the combiner 1108 may split a vertically polarized signal from the OMT 1128 into third and fourth vertically polarized signals (e.g., utilizing splitters, waveguides, and/or circulators). The combiner 1108 may provide the third vertically polarized signal to the ODU 1114 and may provide the fourth vertically polarized signal to the ODU 1116. Similarly, the combiner 1108 may split a horizontally polarized signal from the OMT 1128 into third and fourth horizontally polarized signals. The combiner 1108 may provide the third horizontally polarized signal to the ODU 1114 and may provide the fourth horizontally polarized signal to the ODU 1116. The combiners 1106 and 1108 may utilize circulators instead of splitters. In various embodiments, utilizing a circulator in the combiner may extend to carrying four groups on two cross polar antennas 1102 and 1104. In various embodiments, there are no cables between the ODUs 1110, 1112, 1114, or 1116, no cables between antennas 1102 and 1104, and/or no power splitting.

As discussed, the ODU 1110 and 1112 may function in a manner similar to that described regarding ODU 1006 and 1008 (see FIG. 10). The ODU 1110 may convert the vertically polarized signal and the horizontally polarized signal from the antenna 1102 to a first diversity received signal and a second diversity received signal. The ODU 1110 may provide the first and second diversity received signals within multiple carrier groups over the cable 1118 to the IDU 1118. In one example, each diversity received signal may be provided over the cable 1118 in four 28 MHz carriers (e.g., the ODU 1110 may provide both diversity received signals in eight 28 MHz carriers).

Similarly, the ODU 1112 may convert the vertically polarized signal and the horizontally polarized signal to a third diversity received signal and a fourth diversity received signal. The ODU 1112 may provide the third and fourth diversity received signals within multiple carriers over the cable 1120 to the IDU 1118. In one example, each diversity received signal may be provided over the cable 1120 in four 28 MHz carriers (e.g., the IDU 1112 may provide both diversity received signals in eight 28 MHz carriers).

The ODU 1114 and 1116 may function in a manner similar to that described regarding ODU 1006 and 1008 (see FIG. 10) but with signals received from a different antenna (e.g., antenna 1104). The ODU 1114 may convert the vertically polarized signal and the horizontally polarized signal from the antenna 1104 to a first diversity received signal and a second diversity received signal. The ODU 1114 may provide the first and second diversity received signals within multiple carriers over the cable 1122 to the IDU 1118. In one example, each diversity received signal may be provided over the cable 1122 in four 28 MHz carriers (e.g., the ODU 1114 may provide both diversity received signals in eight 28 MHz carriers).

Similarly, the ODU 1116 may convert the vertically polarized signal and the horizontally polarized signal from the antenna 1104 to a third diversity received signal and a fourth diversity received signal. The ODU 1116 may provide the third and fourth diversity received signals within multiple carriers over the cable 1124 to the IDU 1118. In one example, each diversity received signal may be provided over the cable 1124 in four 28 MHz carriers (e.g., the IDU 1112 may provide both diversity received signals in eight 28 MHz carriers).

For ease of reference, some detail of ODU 1110 is provided. Those skilled in the art will appreciate that ODUs 1112, 1114, and 1116 may share similar components with ODU 1110. For example, ODU 1110 and 1112 may operate in a similar manner as ODU 1006 and 1008 of FIG. 10. Similarly, ODU 1114 and 1116 may also operate in a similar manner as ODU 1006 and 1008 of FIG. 10. However, ODU 1114 and 1116 may perform functions utilizing signals from a different antenna (e.g., antenna 1104) than the functions of ODU 1110 and 1112.

Those skilled in the art will appreciate that the ODU 1110, 1112, 1114, and/or 1116 may provide the signals in any number of carriers or carrier groups.

Those skilled in the art will appreciate that each carrier within the group of carriers may be used for capacity increase or can be used for protection (e.g., redundancy). In some embodiments, 4 GB of capability may be achieved (e.g., 1 GB of data over cables 1118, 1120, 1122, and 1124).

Similar to ODU 1006, ODU 1110 as depicted comprises a waveguide circulator 1130 coupled to waveguide filters 1132 and 1134. In various embodiments, the combiner 1106 provides the vertically polarized signal from the antenna 1102 to the circulator 1130. The circulator 1130 may provide the vertically polarized signal to the waveguide filter 1134. The combiner 1106 may also provide the horizontally polarized signal from the antenna 1102 to waveguide filter 1136. The vertically polarized signal may be a main received signal of the ODU 1110 and the horizontally polarized signal may be a diversity received signal (e.g., diverse to the main received signal).

Waveguide filters 1132, 1134, and 1136 may each be configured to filter and direct signals. The waveguide filters 1134 and 1136 may prevent receive signals from propagating back towards the antenna 1102. Similarly, the waveguide filter 1132 may prevent transmit signals from propagating back towards a transmitter or components of a transmitter (e.g., RF-IF converter or transmitter 1144).

The transmitter 1144 may be configured to provide a transmission signal (e.g., a signal to be transmitted by the antenna 1102 in one polarization) through the power amplifier 1138 to the waveguide filter 1132. Similarly, the waveguide filters 1140 and 1142 may provide signals to the receiver 1146 and 1148 via power amplifiers 1140 and 1142, respectively.

The receivers 1146 and 1148 are any components configured to process and/or convert received signals. In various embodiments, the receivers 1146 and 1148 downconvert signals from the waveguide filters 1140 and 1142 to different intermediate frequencies. The receivers 1146 and 1148 may also provide the signals, respectively, to the N-plexer 1156 in carrier groups (e.g., each signal is provided to the N-plexer 1156 in four 28 MHz groups). In one example, the receiver 1146 provides the formerly vertically polarized receive signal from the waveguide filter 1134 to the N-plexer 1156 via signal path 1152 as four 28 MHz groups. The receiver 1148 may provide the formerly horizontally polarized receive signal from the waveguide filter 1136 to the N-plexer 1156 via signal path 1154 as four other 28 MHz groups.

The N-plexer 1156 is a multi-band device that may be configured to direct or route multiple signals at different frequencies. For example, the N-plexer 1156 may receive a first group from receiver 1146 via signal path 1152 and a second group from receiver 1148 via signal path 1154. The N-plexer 1156 may direct both receive signals over the cable 1118.

The N-plexer 1156 may also receive multiple transmit signals at different frequencies and route the transmit signals. For example, the N-plexer 1156 may receive third carrier group containing one or more signals to be transmitted and the N-plexer 1156 may route fourth group to the transmitter 1144 via signal path 1150. The N-plexer 1156 may route a plurality of signals based on frequencies of the signals. Although an N-plexer 1156 is depicted in FIG. 11, those skilled in the art will appreciate that any device, circuit(s), and/or component(s) may be configured to maintain and/or propagate multiple signals across cable 1118 without interfering the signals or the signals interfering with each other.

The coaxial cable 1118 couples the ODU 1110 and an N-plexer 1158, a modem 1166, and/or the IDU 1118. The coaxial cable 1118 is not limited to coax but may be any cable or combination of cables.

ODU 1112 may be similar to the ODU 1110, however, the ODU 1008 may receive the horizontally polarized signal as a main received signal and a vertically polarized signal as a diversity received signal. The ODU 1112 may provide the received signals as carrier groups over cable 1120 to the IDU 1118. ODU 1112 may function in a manner similar to that of ODU 1008. The ODU 1112 may be coupled to the N-plexer 1160, modem 1168, and/or IDU 1118 via cable 1120. The ODU 1112 may also receive a carrier group of signals to be transmitted from the IDU 1118 over the antenna 1102. In some embodiments, signals to be transmitted received by the ODU 1110 are prepared to be transmitted as vertically polarized signals over the antenna 1102 while the signals to be transmitted received by the ODU 1112 are prepared to be transmitted as horizontally polarized signals over the antenna 1102.

As discussed herein, ODUs 1114 and 1116 may comprise similar components and function in similar ways as ODU 1110 and 1112. ODUs 1114 and 1116 may receive signals from the antenna 1104 and not the antenna 1102. For example, ODU 1114 may receive the vertically polarized signal from the antenna 1104 via the combiner 1108 as a "main" received signal and a horizontally polarized signal from the antenna 1104 as a diversity received signal. The ODU 1114 may provide the received signals as carrier groups over cable 1122 to the IDU 1118. ODU 1116 may function in a manner similar to that of ODU 1008. The ODU 1116 may be coupled to the N-plexer 1164, modem 1172, and/or IDU 1118 via cable 1124.

The IDU 1118 may be any unit configured to communicate with the ODU 1110, 1112, 1114, and 1116 over the cables 1118, 1120, 1122, and 1124, respectively. There may be any number of IDUs (e.g., four distinct IDUs with separate modems each in communication with a different ODU).

The IDU 1118 may comprise an N-plexer 1158 electrically coupled with the cable 1118 and a modem 1166. The modem 1166 may further be coupled with an IF-BB converter which may be in communication with customer premises equipment. The IDU 1118 may also comprise an N-plexer 1160 electrically coupled with the cable 1120 and a modem 1168. Further, IDU 1118 may comprise N-plexers 1162 and 1164 electrically coupled to the cable 1122 and 1124, respectively. N-plexer 1162 may also be electrically coupled to modem 1170 and N-plexer 1164 may be electrically coupled to modem 1172. The modems 1168, 1170, and 1172 may each be coupled with a separate IF-BB converter which may be in communication with customer premises equipment.

The modems 1168, 1170, and 1172 may, in some embodiments, communicate with each other (e.g., to take advantage of spatial diversity and/or polarization diversity for protection). For example, modems 1166 and 1168 may communicate with each other when polarization of signals from the antenna 1102 are utilized for protection (e.g., to recover weak signals). Similarly, modems 1170 and 1172 may communicate with each other when polarization of signals from the antenna 1104 is utilized for protection. In various embodiments, modem 1166 and/or 1168 determine if a signal is weak and provides control instructions for the sending antenna (e.g., one or more antennas transmitting to antenna 1102) to utilize the polarizations of the signals for redundancy. Modems 1170 and 1172 may operate in a similar fashion based on signals received from antenna 1104.

In various embodiments, different modems may be coupled with each other to take advantage of spatial diversity of antennas 1102 and 1104. For example, modem 1166 may be coupled to modem 1172 and modem 1168 may be coupled to modem 1170.

In various embodiments, modem 1166 and/or 1172 determine if a signal is weak and provides control instructions for the antennas to utilize spatial diversity of the signals for redundancy. Modems 1168 and 1170 may operate in a similar fashion.

Those skilled in the art will appreciate that the different polarized signals from both antennas 1102 and 1104 (e.g., four signals) may contain non-redundant data to improve data throughput to the CPE. Further, one or more modems or other components may instruct antennas 1102, 1104, and/or other antennas in communication with the antennas 1102 and 1104 to utilize redundant systems (e.g., polarization diversity for redundancy and/or spatial diversity for redundancy) as needed based on assessment of signal quality from the antennas 1102 and 1104.

Those skilled in the art will appreciate that the IDU 1118 may comprise any number of components, including, for example, a power module and a telemetry module as discussed herein. The power module may provide power to ODUs 1110, 1112, 1114, and/or 1116 via cables 1118, 1120, 1122, and/or 1124, respectively. One or more telemetry modules may be configured to detect and correct for errors in received signals and provide corrective information to the ODUs 1110, 1112, 1114, and/or 1116 via cables 1118, 1120, 1122, and/or 1124. Further, the IDU 1118 may comprise gain adjusters, filters, and/or phase adjusters, or the like.

The components of the IDU 1118 may comprise an IF-BB converter as descripted with respect to IDU 1010. In some embodiments, an IF-BB converter may be coupled to the N-plexer 1158 and the modem 1166 or any N-plexer and modem coupled to that particular N-plexer. For example, the IF-BB converter may be configured to downconvert diversity received signals and/or carrier groups received from the N-plexer 1158 before providing the downconverted diversity received signals and/or carrier groups to the modem 1166. Similarly, the IF-BB converter may upconvert diversity transmit signals and/or carrier groups to different frequencies. The IF-BB converter may receive the diversity transmit signals and/or carrier groups from the modem 1166 and provide the upconverted signals to the N-plexer 1158.

In various embodiments, the N-plexer 1158 may direct diversity received signals from the cable 1118 to one or more different signal paths based on the frequency of the carrier groups. The N-plexer 1158 may also receive transmit signals from the modem 1166. As discussed herein, the diversity transmit signals may be grouped in carriers (e.g., four carriers of 24 MHz) utilizing different frequencies from the groups of carriers provided for the diversity received signals. Those skilled in the art will appreciate that there may be any number of signals and corresponding signal paths between the modem 1166 and the N-plexer 1158. The N-plexers 1160, 1162, and 1164 may operate in a similar manner in conjunction with modems 1168, 1170, and 1172, respectively.

In various embodiments, the N-plexer 1158 may direct diversity received signals from the cable 1118 to one or more different signal paths based on the frequency of the carrier groups. The N-plexer 1158 may also receive transmit signals and/or carrier groups from the modem 1080. The diversity transmit signals may be grouped in carriers (e.g., four carriers of 24 MHz) utilizing different frequencies from the groups of carriers provided for the diversity received signals. Those skilled in the art will appreciate that there may be any number of signals and corresponding signal paths between the modem 1166 and the N-plexer 1158.

The modems 1166, 1168, 1170, and 1172 may be any modems configured to demodulate diversity received signals and/or carrier groups, and modulate diversity transmit signals (e.g., upconverted signals to be transmitted received from the customer equipment) and/or carrier groups. In various embodiments, the modems 1166, 1168, 1170, and 1172 converts modulated diversity transmit signals to groups of different or similar frequency carriers.

Figure 12:
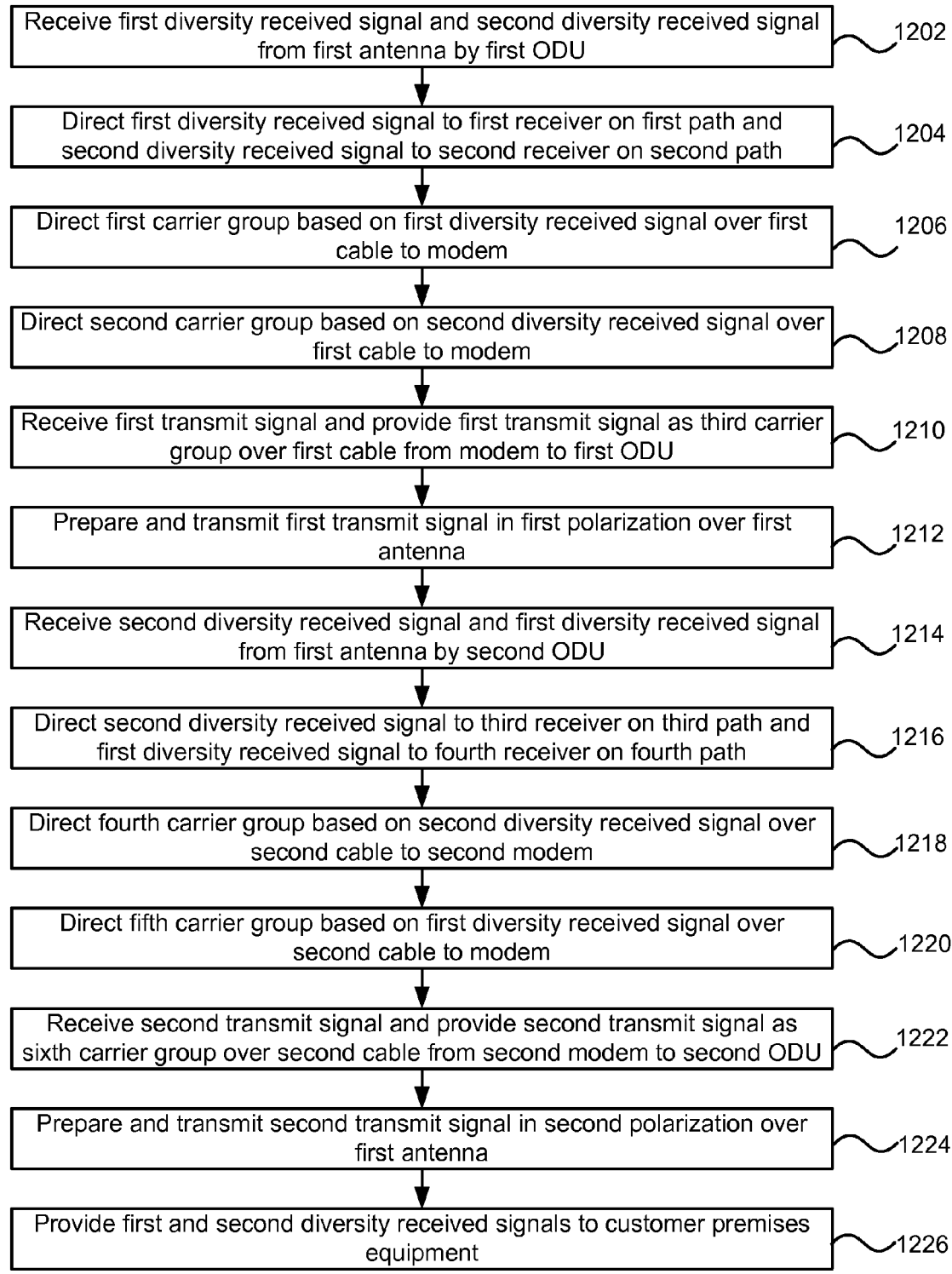
FIG. 12 is a flow diagram for providing carrier groups over a cable in a split mount high capacity system in some embodiments.

FIG. 12 is a flow diagram for providing carrier groups over a cable in a split mount high capacity system in some embodiments. Various embodiments include a single antenna coupled to two ODUs which are, in turn, each coupled to a separate modem over a separate cable. In some embodiments, two antennas are each coupled to two different ODUs. Each of the four ODUs may be coupled to a separate modem over four cables (e.g., one ODU may be coupled to one modem over one cable). Those skilled in the art will appreciate that there may be any number of antennas and any number of ODUs. For the purposes of this flowchart, an antenna coupled to a combiner and two ODUs are described.

In step 1202, the first ODU 1110 receives a first and second diversity received signal from a first antenna 1102. In one example, the first diversity received signal may be vertically polarized and the second diversity received signal may be horizontally polarized. The ODU 1110 may receive the first and second diversity received signals via a combiner 1106.

In step 1204, the first ODU 1110 directs the first diversity received signal (Rx1) to a first receiver 1146 and the second diversity received signal (RxA) to a second receiver 1148. In some embodiments, waveguide filter 1134 converts a vertically polarized signal from the antenna 1102 to a first diversity received signal and a waveguide filter 1136 converts a horizontally polarized signal from the antenna 1102 to a second diversity received signal. Both first and second diversity signals may be amplified with power amplifier 1140 and 1142, respectively.

In step 1206, the receiver 1146 provides the first diversity received signal as a carrier group over cable 1118 to modem 1166. For example, receiver 1146 may generate the first carrier group for the first diversity received signal and provide the first carrier group to the N-plexer 1156 via signal path 1152. The N-plexer 1156 may provide the first carrier group to the modem 1166 (e.g., utilizing N-plexer 1158 of IDU 1118) via the cable 1118.

In step 1208, the receiver 1148 provides the second diversity received signal as a second carrier group over cable 1118 to modem 1166. For example, receiver 1148 may generate the second carrier group for the second diversity received signal and provide the second carrier group to the N-plexer 1156 via signal path 1154. The N-plexer 1156 may provide the second carrier group to the modem 1166 (e.g., utilizing N-plexer 1158 of IDU 1118) via the cable 1118.

In step 1210, the modem 1166 may receive and provide a first transmit signal as a third carrier group over the first cable 1118 to the transmitter 1144. For example, the modem 1166 or other component may generate a third carrier group for the first transmit signal and provide the third carrier group to the N-plexer 1158. The N-plexer 1158 may provide the third carrier group over the first cable 1118 to the transmitter 1144 via the N-plexer 1156 and signal path 1150.

Those skilled in the art will appreciate that three carrier groups may be present on cable 1118 at any time. Each carrier group may comprise four 28 MHz carriers.

In step 1212, the transmitter prepares the first transmit signal from the third carrier group and transmits the first transmit signal to be transmitted as a vertically polarized signal over the antenna 1102. As discussed herein, the first transmitted signal may be upconverted from a baseband frequency to an intermediate frequency by the modem 1166 and may again be upconverted to a transmission frequency by an upconverter prior to being polarized and transmitted by the antenna 1102. Similarly, the first and second diversity signals may be downconverted by a converter or receivers (e.g., receivers 1146 and 1148, respectively) to an IF frequency and again downconverted to a baseband frequency by the IDU 1118.

Steps 1214-1224 are similar to steps 1202-1212 utilizing the second ODU 1112.

In step 1214, the second ODU 1112 receives the second and first diversity received signal from the first antenna 1102. In one example, the second diversity received signal may be horizontally polarized and the first diversity received signal may be vertically polarized. The ODU 1112 may receive the second and first diversity received signals via a combiner 1106.

In step 1216, the first ODU 1112 directs the second diversity received signal (Rx2) to a first receiver and the second diversity received signal (RxB) to a second receiver. In some embodiments, a waveguide filter converts a vertically polarized signal from the antenna 1102 to a second diversity received signal and a waveguide filter converts a horizontally polarized signal from the antenna 1102 to a first diversity received signal. Both first and second diversity signals may be amplified with power amplifiers.

In step 1218, a receiver provides the second diversity received signal as a fourth carrier group over cable 1120 to modem 1168. For example, receiver may generate the fourth carrier group for the second diversity received signal and provide the fourth carrier group to an N-plexer. The N-plexer may provide the fourth carrier group to the modem 1168 (e.g., utilizing N-plexer 1160 of IDU 1118) via the cable 11120.

In step 1220, the receiver provides the first diversity received signal as a fifth carrier group over cable 1120 to modem 1168. For example, the receiver may generate the fifth carrier group for the first diversity received signal and provide the fifth carrier group to the N-plexer. The N-plexer may provide the fifth carrier group to the modem 1168 (e.g., utilizing N-plexer 1160 of IDU 1118) via the cable 1120.

In step 1222, the modem 1168 may receive and provide a second transmit signal as a sixth carrier group over the first cable 1120 to a transmitter in the ODU. For example, the modem 1168 or other component may generate a sixth carrier group for the second transmit signal and provide the sixth carrier group to the N-plexer 1160. The N-plexer 1160 may provide the sixth carrier group over the second cable 1120 to the transmitter via the N-plexer 1158.

Those skilled in the art will appreciate that three carrier groups may be present on cable 1120 at any time. Each carrier group may comprise four 28 MHz carriers.

In step 1224, the transmitter prepares the second transmit signal from the sixth carrier group and transmits the second transmit signal to be transmitted as a horizontally polarized signal over the antenna 1102. As discussed herein, the second transmitted signal may be upconverted from a baseband frequency to an intermediate frequency by the modem 1168 and may again be upconverted to a transmission frequency by an upconverter prior to being polarized and transmitted by the antenna 1102. Similarly, the first and second diversity signals may be downconverted by a converter or receivers to an IF frequency and again downconverted to a baseband frequency by the IDU 1118.

In step 1226, the first and second diversity signals may be provided by the IDU 1118 to customer premises equipment or any equipment. In various embodiments, signals received from the ODUS are combined by modems 1168 and/or 1166 utilizing spatial or cross pole diversity (e.g., for redundancy to protect communication or to increase capacity). In some embodiments, the modem 1168 may utilize the first and second diversity signals (e.g., Rx1 and RxA) for MRC.

Those skilled in the art will appreciate that the system may comprise a second antenna 1104 coupled to a second combiner 1108. The second combiner 1108 may be coupled to a third ODU 1114 and a fourth ODU 1116. The third ODU 1114 and fourth ODU 1116 may be coupled to different modems of the IDU 11118 via cables 1122 and 1124. The ODU 1114 and ODU 1116 may function in a manner similar to ODU 1110 and 1112 but utilizing signals from second antenna 1104. For example, the ODU 1114 may prepare a third transmit signal (Tx3) from the modem 1170 to transmit a vertically polarized signal over antenna 1104. The ODU 1116 may prepare a fourth transmit signal (Tx4) from the modem 1172 to transmit a horizontally polarized signal over antenna 1104.

Further, ODU 1114 may receive a first diversity received signal (Rx3) in a vertically polarized orientation from antenna 1104 and a second diversity received signal (RxC) in a horizontally polarized orientation from antenna 1104. Similarly, ODU 1116 may receive a first diversity received signal (Rx4) in a horizontally polarized orientation from antenna 1104 and a second diversity received signal (RxD) in a vertically polarized orientation from antenna 1104.

The ODU 1114 may convert the first diversity received signal from the antenna 1104 to a seventh carrier group and the second diversity received signal from the antenna 1104 to a eighth carrier group for providing over the cable 1122 to the modem 1170. The modem 1170 may convert a transmit signal received from other equipment to a ninth carrier group for providing over cable 1122 to a transmitter in ODU 1114 for transmission.

Similarly, the ODU 1116 may convert the second diversity received signal from the antenna 1104 to a tenth carrier group and the first diversity received signal from the antenna 1104 to a eleventh carrier group for providing over the cable 1124 to the modem 1172. The modem 1172 may convert a transmit signal received from other equipment to a twelfth carrier group for providing over cable 1124 to a transmitter in ODU 1116 for transmission.

In various embodiments, different methods may be used to strengthen signals. Further, in some embodiments, modems 1166 and 1172 are coupled to allow for spatial diversity to be utilized to increase capacity, detect weak communications, or utilize spatial diversity for protection (e.g., redundancy) of communication. Similarly, the modems 1168 and 1170 may be coupled for similar reasons.

Further, one or more functions may be stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

The invention claimed is:

1. A system comprising:
 a first antenna configured to receive a first diversity received signal and a second diversity received signal, the first diversity received signal and the second diversity received signal being received at a received microwave frequency and the first diversity received signal and the second diversity received signal having signal diversity;
 a first signal path having a first converter configured to convert the first diversity received signal from the received microwave frequency to a first carrier group;
 a second signal path having a second converter configured to convert the second diversity received signal from the received microwave frequency to a second carrier group; and
 a first N-plexer configured to provide the first carrier group and the second carrier group to a first cable in communication with a first modem.

2. The system of claim 1 wherein the first antenna is further configured to receive a third diversity received signal and a fourth diversity received signal, the third diversity received signal and the fourth diversity received signal being received at the received microwave frequency and the third diversity received signal and the fourth diversity received signal having signal diversity, the system further comprising:
 a third signal path having a third converter configured to convert the third diversity received signal from the received microwave frequency to a third carrier group;
 a fourth signal path having a fourth converter configured to convert the fourth diversity received signal from the received microwave frequency to a fourth carrier group; and
 a second N-plexer configured to provide the third carrier group and the fourth carrier group to a second cable in communication with a second modem.

3. The system of claim 1 wherein the first modem retrieves the first and second diversity received signals from the first and second carrier groups and provides the first and second diversity received signals to a path in communication with customer premises equipment.

4. The system of claim 2 wherein the second modem retrieves the third and fourth diversity received signals from the third and fourth carrier groups and provides the third and fourth diversity received signals to a path in communication with customer premises equipment.

5. The system of claim 2 wherein the first diversity received signal and the fourth diversity received signal are vertically polarized signals from the first antenna, and the second diversity received signal and the third diversity received signal are horizontally polarized signals from the first antenna.

6. The system of claim 2 further comprising:
 a third N-plexer configured to receive the first carrier group and the second carrier group from the first cable;
 wherein the first modem is configured to demodulate signals of the first and second carrier groups.

7. The system of claim 6 further comprising:
 a fourth N-plexer configured to receive the third carrier group and the fourth carrier group from the second cable;
 wherein the second modem is configured to demodulate signals of the third and fourth carrier groups.

8. The system of claim 6 wherein the first modem performs maximum ratio combining utilizing the first diversity received signal and the second diversity received signal.

9. The system of claim 7 wherein the first modem communicates with the second modem to take advantage of polarization diversity.

10. The system of claim 7 wherein the first and fourth diversity received signals are provided from an orthomode transducer coupled to the first antenna.

11. The system of claim 10 wherein the second and third diversity received signals are diverse from the first and fourth diversity received signals, the second and third diversity received signals being provided from the orthomode transducer coupled to the first antenna.

12. The system of claim 7 wherein the first, second, third and fourth carrier groups each comprise 28 MHz carriers.

13. The system of claim 7 wherein the first modem provides a first transmit diversity signal as a fifth carrier group and the second modem provides a second transmit diversity signal as a sixth carrier group, wherein:
 the third N-plexer is further configured to provide the fifth carrier group to the first cable;
 the fourth N-plexer is further configured to provide the sixth carrier group to the second cable;
 the first N-plexer is further configured to provide the fifth carrier group to a first transmitter for transmission of the first transmit diversity signal over the first antenna at a first polarization; and
 the second N-plexer is further configured to provide the sixth carrier group to a second transmitter for transmission of the second transmit diversity signal over the first antenna at a second polarization that is diverse to the first polarization.

14. The system of claim 13 wherein the first cable may propagate the first, second, and fifth carrier groups simultaneously.

15. A method comprising:
 receiving, by a first antenna, a first diversity received signal and a second diversity received signal, the first diversity received signal and the second diversity received signal being received at a received microwave frequency and the first diversity received signal and the second diversity received signal having signal diversity;

converting, by a first converter electrically coupled to a first signal path, the first diversity received signal from the received microwave frequency to a first carrier group;

converting, by a second converter electrically coupled to a second signal path, the second diversity received signal from the received microwave frequency to a second carrier group; and providing, by a first N-plexer, the first carrier group and the second carrier group to a first cable in communication with a first modem.

16. The method of claim 15 further comprising:
receiving, by the first antenna, a third diversity received signal and a fourth diversity received signal, the third diversity received signal and the fourth diversity received signal being received at the received microwave frequency and the third diversity received signal and the fourth diversity received signal having signal diversity;

converting, by a third converter electrically coupled to a third signal path, the third diversity received signal from the received microwave frequency to a third carrier group;

converting, by a fourth converter electrically coupled to a fourth signal path, the fourth diversity received signal from the received microwave frequency to a fourth carrier group; and providing, by a second N-plexer, the third carrier group and the fourth carrier group to a second cable in communication with a second modem.

17. The method of claim 15 further comprising retrieving, by the first modem, the first and second diversity received signals from the first and second carrier groups and providing, by the first modem, the first and second diversity received signals to a path in communication with customer premises equipment.

18. The method of claim 16 further comprising retrieving, by the second modem, the third and fourth diversity received signals from the third and fourth carrier groups and providing, by the second modem, the third and fourth diversity received signals to a path in communication with customer premises equipment.

19. The method of claim 16 wherein the first diversity received signal and the fourth diversity received signal are vertically polarized signals from the first antenna, and the second diversity received signal and the third diversity received signal are horizontally polarized signals from the first antenna.

20. The method of claim 16 further comprising:
receiving, by a third N-plexer, the first carrier group and the second carrier group from the first cable; and
demodulating, by the first modem, signals of the first and second carrier groups.

21. The method of claim 19 further comprising:
receiving, by a fourth N-plexer, the third carrier group and the fourth carrier group from the second cable; and
demodulating signals, by the second modem, of the third and fourth carrier groups.

22. The method of claim 20 further comprising performing maximum ratio combining, by the first modem, utilizing the first diversity received signal and the second diversity received signal.

23. The method of claim 20 further comprising communicating between the first and second modems to take advantage of polarization diversity.

24. The method of claim 21 further comprising providing, by an orthomode transducer coupled to the first antenna, the first and fourth diversity received signals.

25. The method of claim 24 wherein the second and third diversity received signals are diverse from the first and fourth diversity received signals, the second and third diversity received signals being provided from the orthomode transducer coupled to the first antenna.

26. The method of claim 21 wherein the first, second, third and fourth carrier groups each comprise 28 MHz carriers.

27. The method of claim 21 further comprising:
providing, by the first modem, a first transmit diversity signal as a fifth carrier group;
providing, by the second modem, a second transmit diversity signal as a sixth carrier group;
providing, by the third N-plexer, the fifth carrier group to the first cable in communication with a first transmitter for transmission of the first transmit diversity signal over the first antenna at a first polarization; and
providing, by the fourth N-plexer, the sixth carrier group to the second cable in communication with a second transmitter for transmission of the second transmit diversity signal over the first antenna at a second polarization that is diverse to the first polarization.

28. A system comprising:
a first antenna configured to receive a first diversity received signal and a second diversity received signal, the first diversity received signal and the second diversity received signal being received at a received microwave frequency and the first diversity received signal and the second diversity received signal having signal diversity;
means for converting the first diversity received signal from the received microwave frequency to a first carrier group;
means for converting the second diversity received signal from the received microwave frequency to a second carrier group; and
a first N-plexer configured to provide the first carrier group and the second carrier group to a first cable in communication with a first modem.

29. The system of claim 28 wherein the first antenna is further configured to receive a third diversity received signal and a fourth diversity received signal, the third diversity received signal and the fourth diversity received signal being received at the received microwave frequency and the third diversity received signal and the fourth diversity received signal having signal diversity, the system further comprising:
means for converting the third diversity received signal from the received microwave frequency to a third carrier group;
means for converting the fourth diversity received signal from the received microwave frequency to a fourth carrier group; and
a second N-plexer configured to provide the third carrier group and the fourth carrier group to a second cable in communication with a second modem.

* * * * *

UNITED STATES PATENT AND TRADEMARK OFFICE
CERTIFICATE OF CORRECTION

PATENT NO. : 8,842,788 B2  
APPLICATION NO. : 13/740087  
DATED : September 23, 2014  
INVENTOR(S) : Paul A. Kennard et al.

Page 1 of 1

It is certified that error appears in the above-identified patent and that said Letters Patent is hereby corrected as shown below:

On the title page item 60 - Related U.S. Application Data:
"Provisional application No. 13/740,087, filed on Jan. 11, 2013" should read
-- Provisional application No. 61/548,063, filed on Oct. 17, 2011 --.

In the Claims
Claim 21, column 43, lines 56-57:
"demodulating signals, by the second modem, of the third and fourth carrier groups" should read
-- demodulating, by the second modem, signals of the third and fourth carrier groups --.

Signed and Sealed this
Seventh Day of July, 2015

Michelle K. Lee
*Director of the United States Patent and Trademark Office*